Aug. 14, 1962 L. S. WILLIAMS 3,049,287
CHART READING MECHANISM
Filed Nov. 15, 1957 13 Sheets-Sheet 1
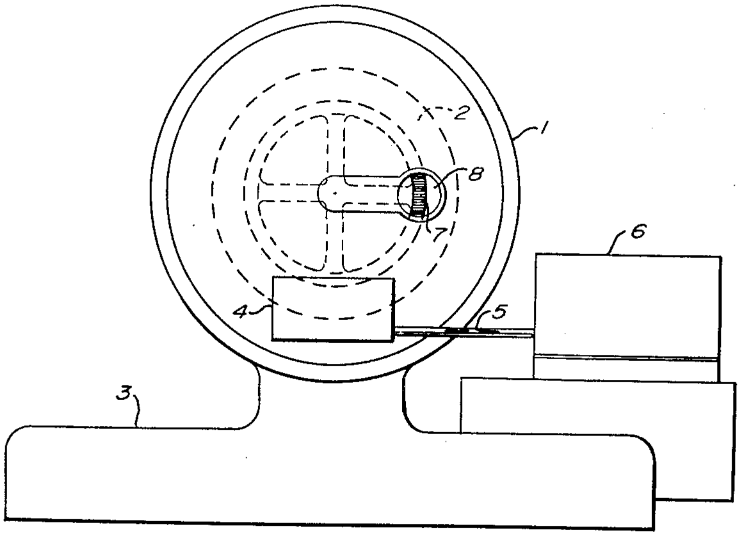
Fig. I
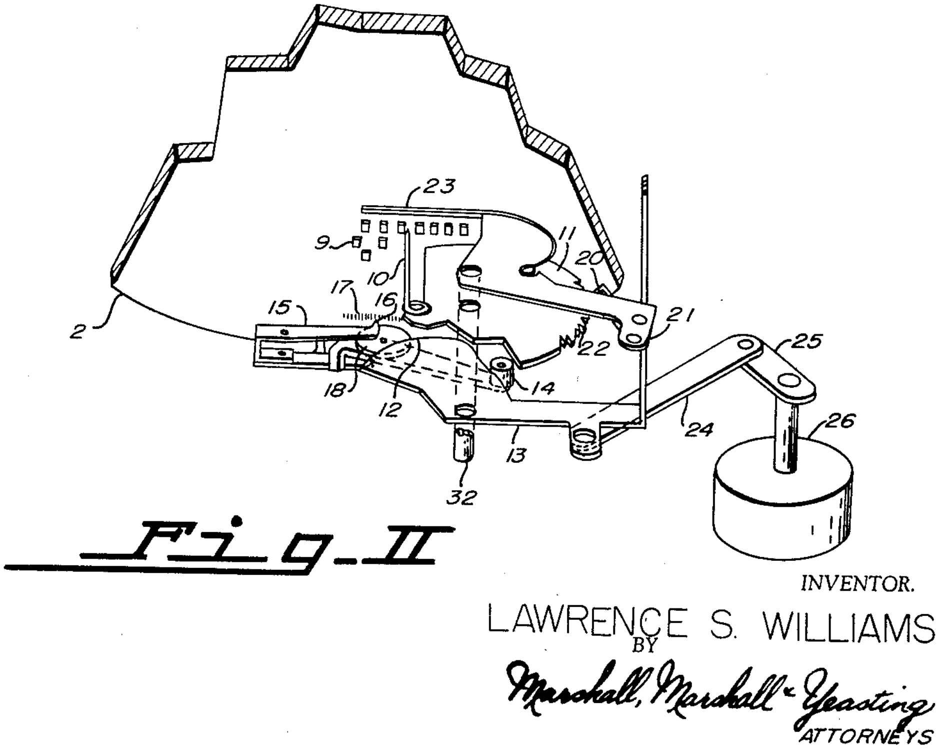
Fig. II
INVENTOR.
LAWRENCE S. WILLIAMS
BY
Marshall, Marshall & Yeasting
ATTORNEYS Aug. 14, 1962 L. S. WILLIAMS 3,049,287
CHART READING MECHANISM
Filed Nov. 15, 1957 13 Sheets-Sheet 2
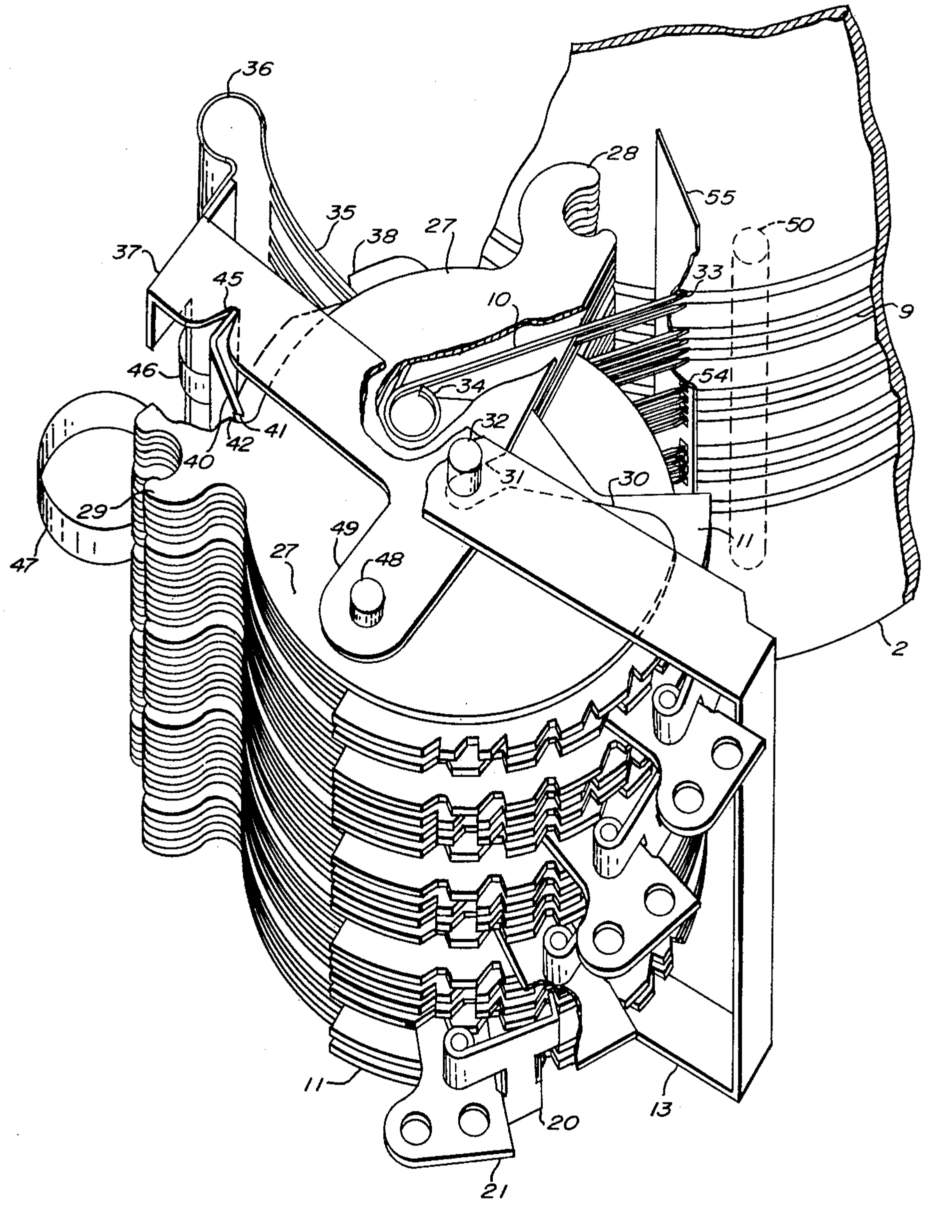
Fig. III
INVENTOR.
LAWRENCE S. WILLIAMS
BY
Marshall, Marshall & Yeasting
ATTORNEYS

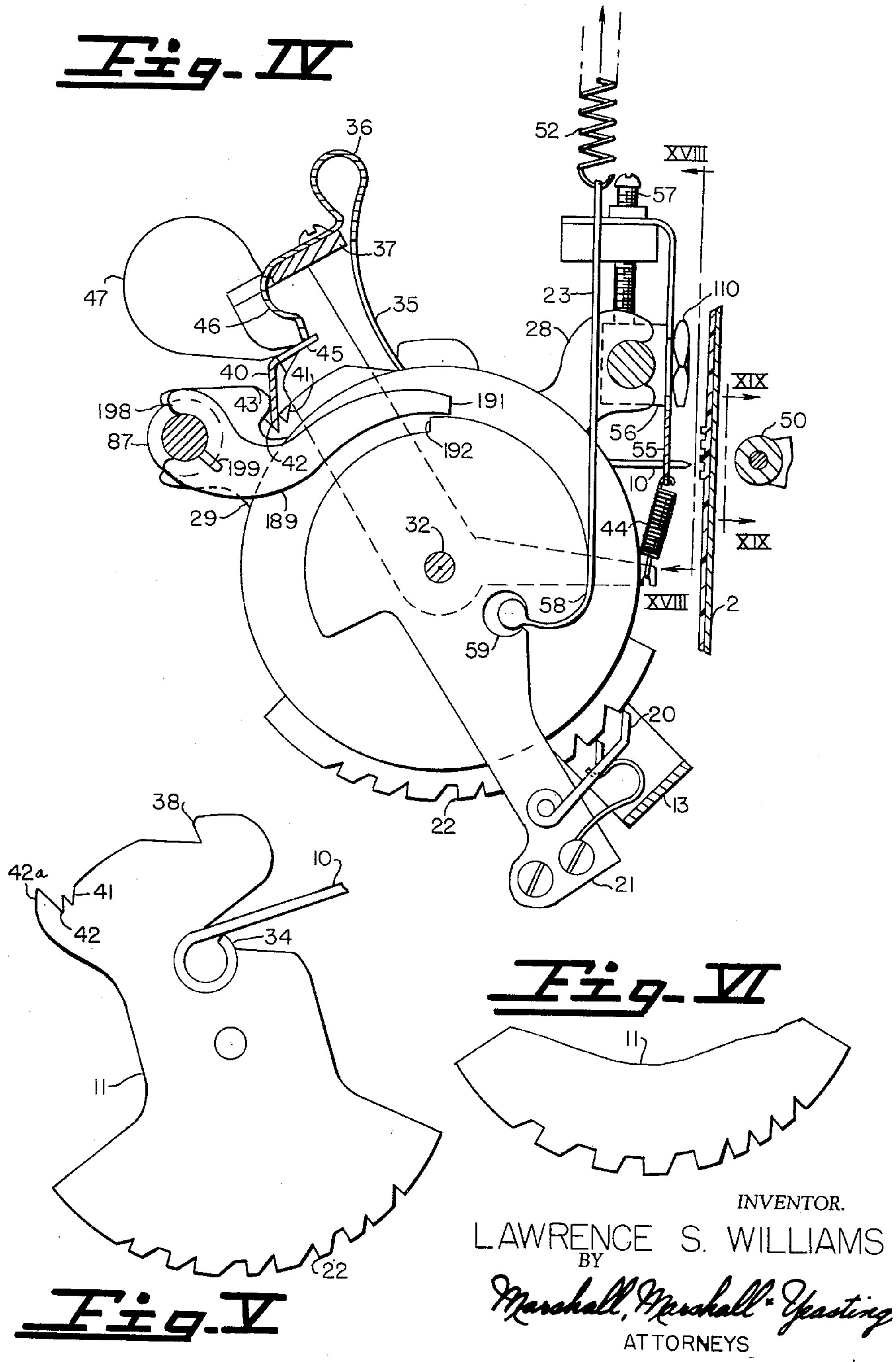
Fig. IV, Fig. V, Fig. VI
INVENTOR.
LAWRENCE S. WILLIAMS
BY
Marshall, Marshall & Yeasting
ATTORNEYS

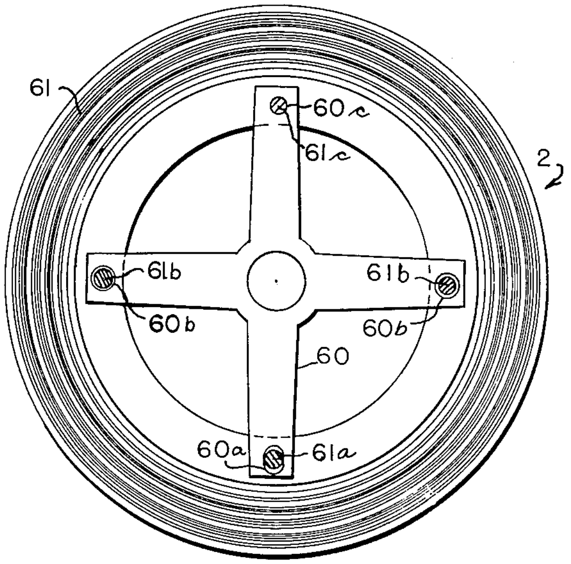
Fig. VII
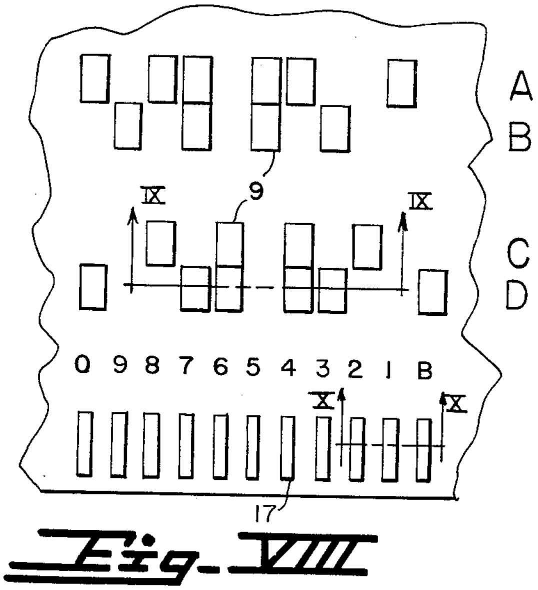
Fig. VIII
| CODE | | | | |
|---|---|---|---|---|
| | A | B | C | D |
| BLANK | | | | D |
| 0 | A | | | D |
| 1 | A | | | |
| 2 | | | C | |
| 3 | | B | | D |
| 4 | A | | C | D |
| 5 | A | B | | |
| 6 | | | C | D |
| 7 | A | B | | D |
| 8 | A | | C | |
| 9 | | B | | |
Fig. XI
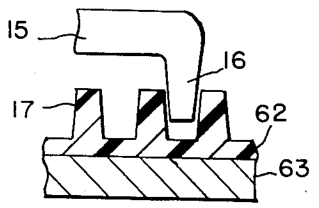
Fig. X
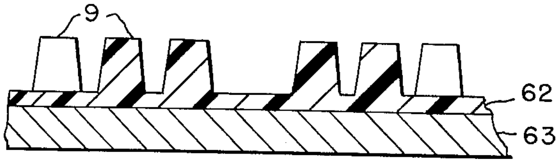
Fig. IX
INVENTOR.
LAWRENCE S. WILLIAMS
BY
Marshall, Marshall & Yeasting
ATTORNEYS

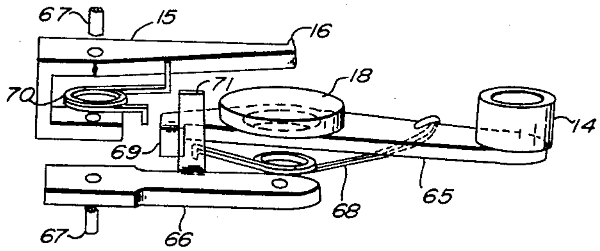
Fig. XII
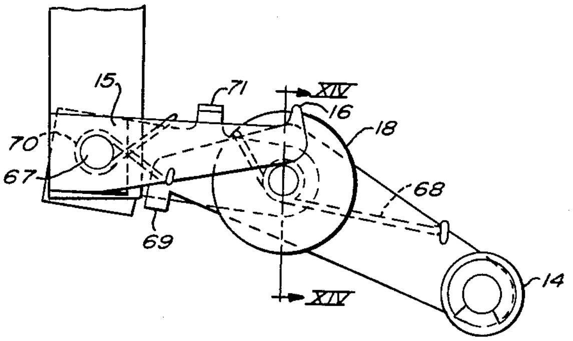
Fig. XIII
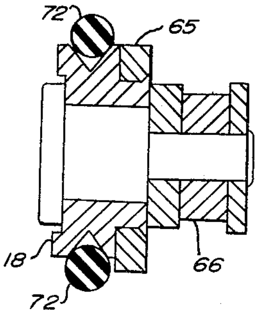
Fig. XIV
INVENTOR.
LAWRENCE S. WILLIAMS
BY
Marshall, Marshall & Yeasting
ATTORNEYS

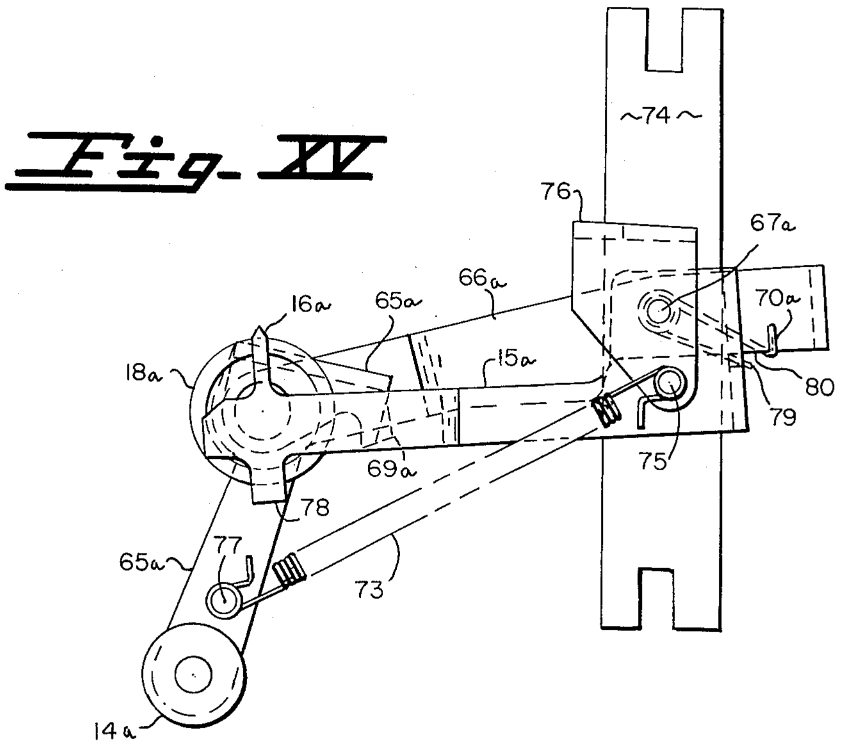
Fig. XV
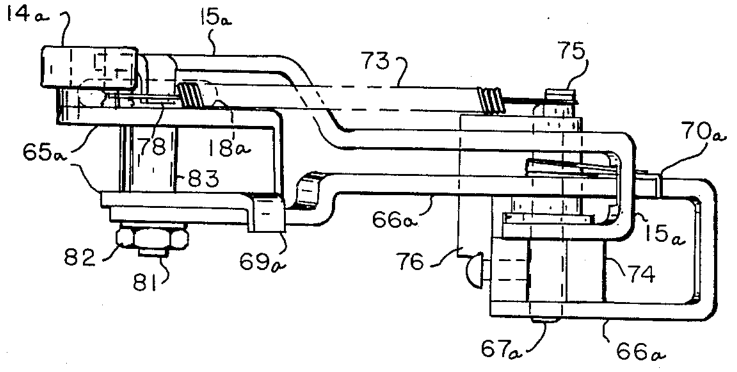
Fig. XVI
INVENTOR.
LAWRENCE S. WILLIAMS
BY
Marshall, Marshall & Yeasting
ATTORNEYS

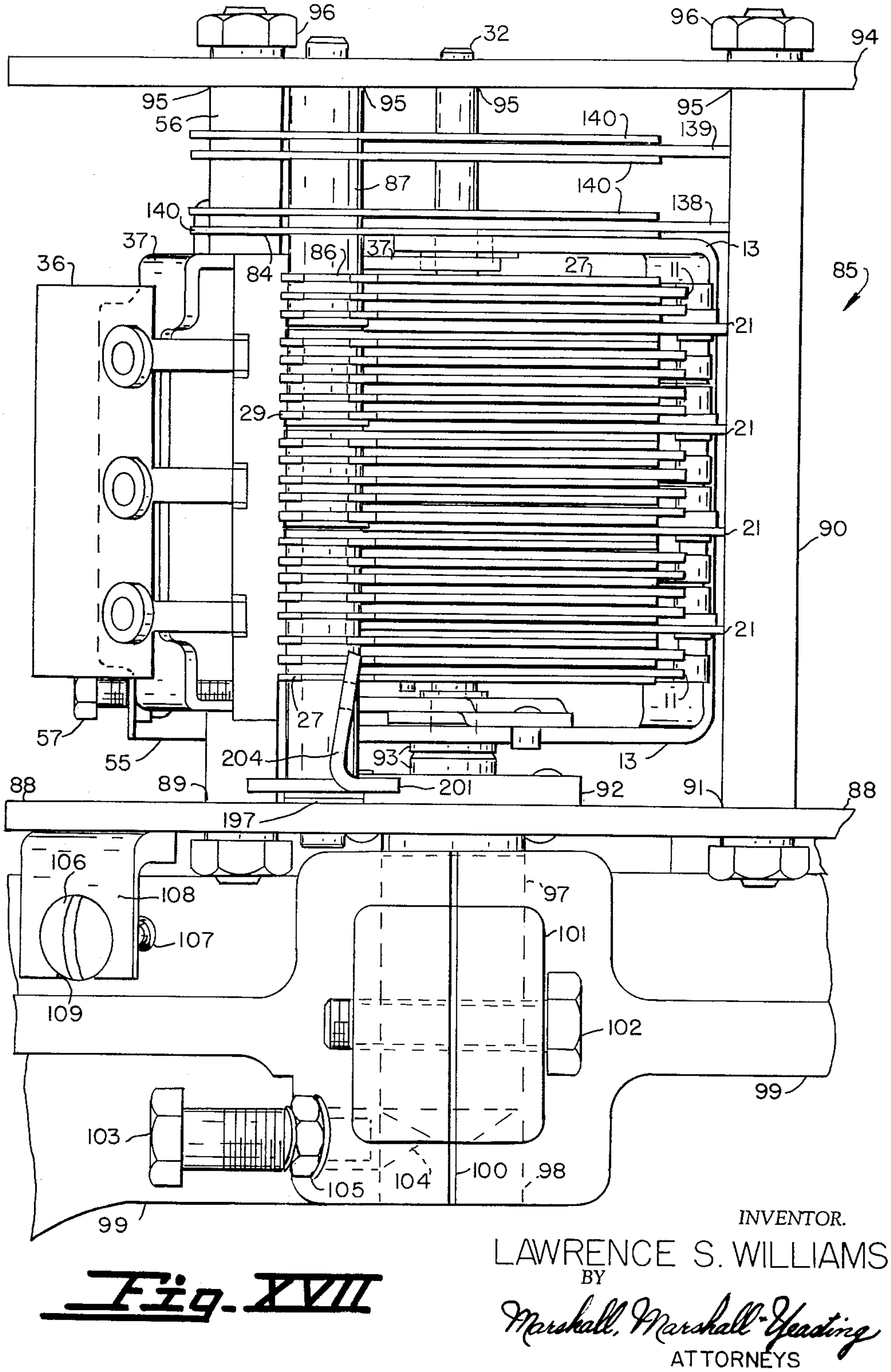
Fig. XVII
INVENTOR.
LAWRENCE S. WILLIAMS
BY
Marshall, Marshall & Yeasting
ATTORNEYS

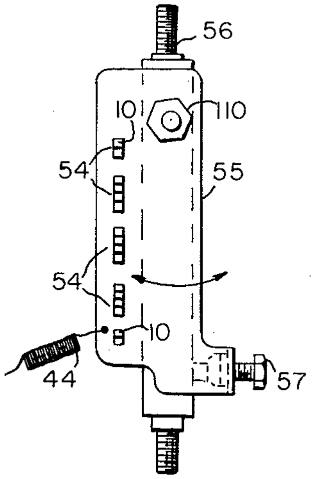
Fig. XVIII
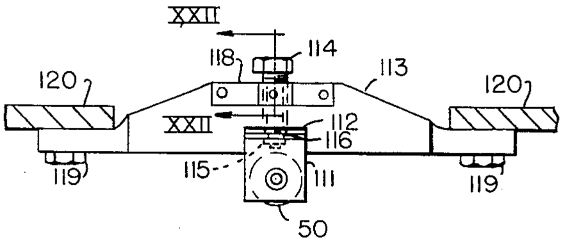
Fig. XX
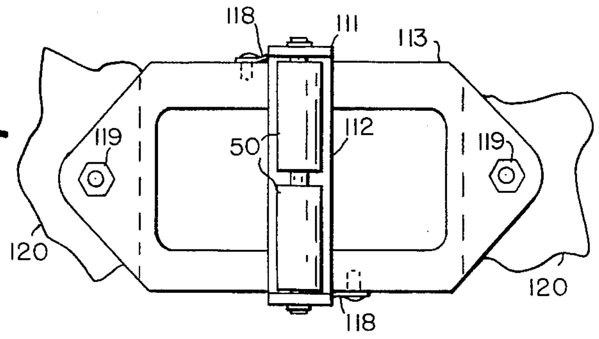
Fig. XIX
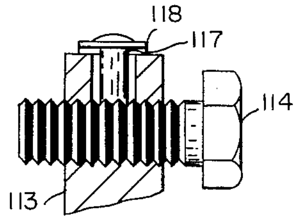
Fig. XVII
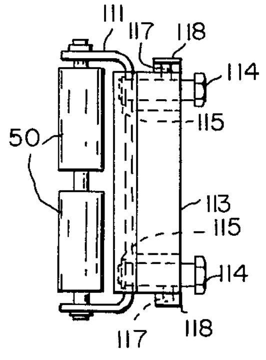
Fig. XXI
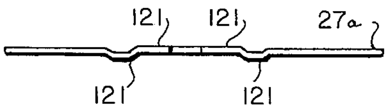
Fig. XXIII
INVENTOR.
LAWRENCE S. WILLIAMS
BY
Marshall, Marshall & Yeasting
ATTORNEYS

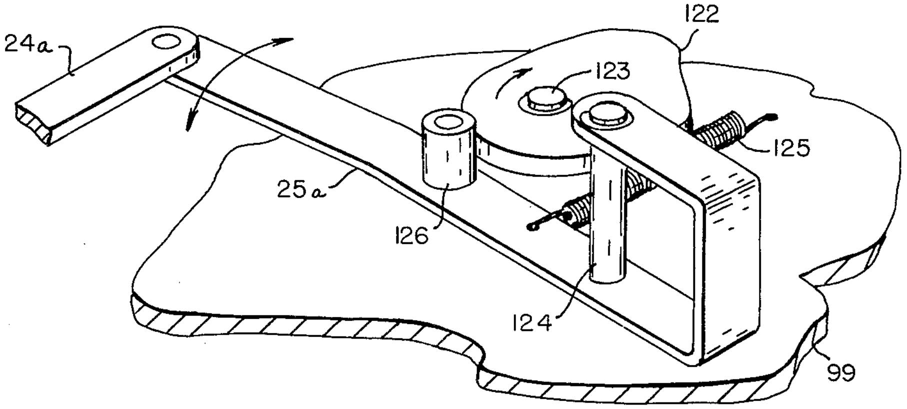
Fig. XXIV
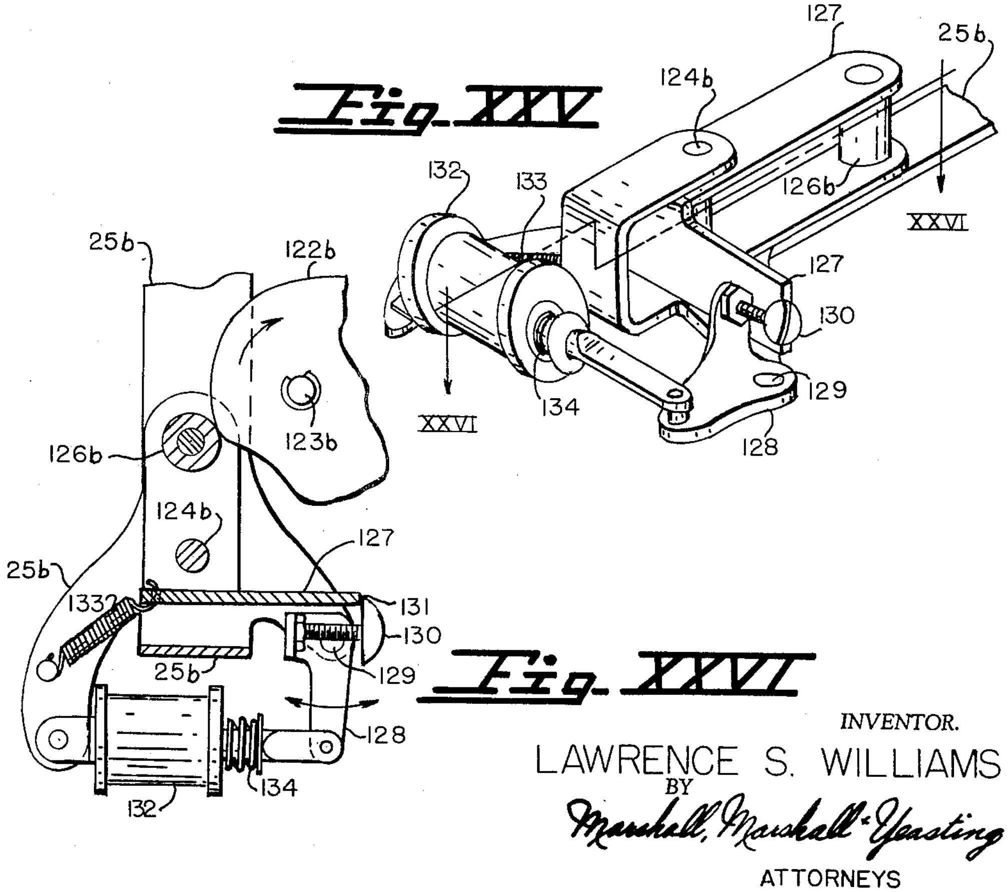
Fig. XXV Fig. XXVI
INVENTOR.
LAWRENCE S. WILLIAMS
BY
Marshall, Marshall & Yeasting
ATTORNEYS

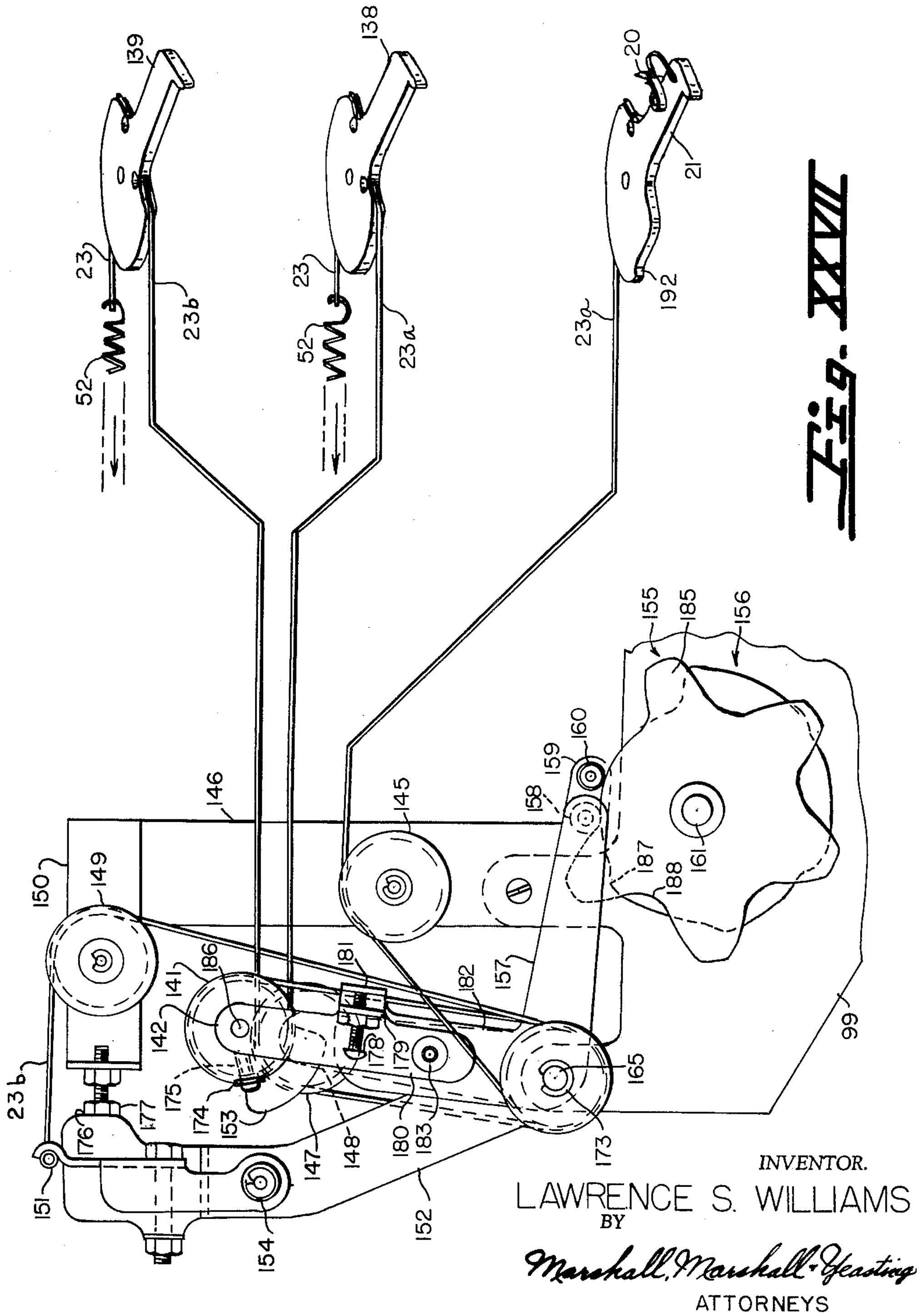
Fig. XXVII
INVENTOR.
LAWRENCE S. WILLIAMS
BY
Marshall, Marshall & Yeasting
ATTORNEYS

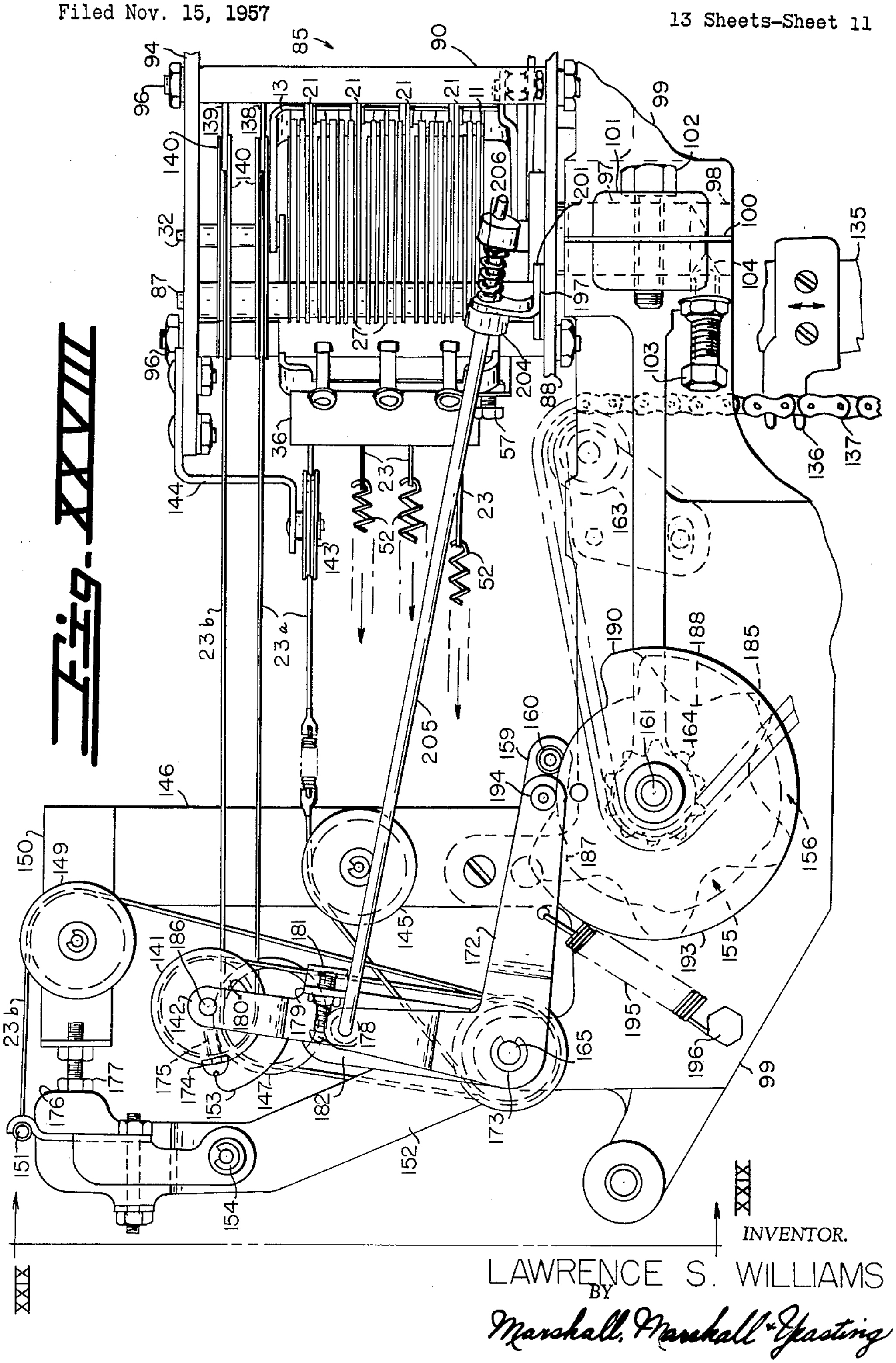
Fig-XXVIII
INVENTOR.
LAWRENCE S. WILLIAMS
BY
Marshall, Marshall & Yeasting
ATTORNEYS Aug. 14, 1962 L. S. WILLIAMS 3,049,287
CHART READING MECHANISM
Filed Nov. 15, 1957 13 Sheets-Sheet 12
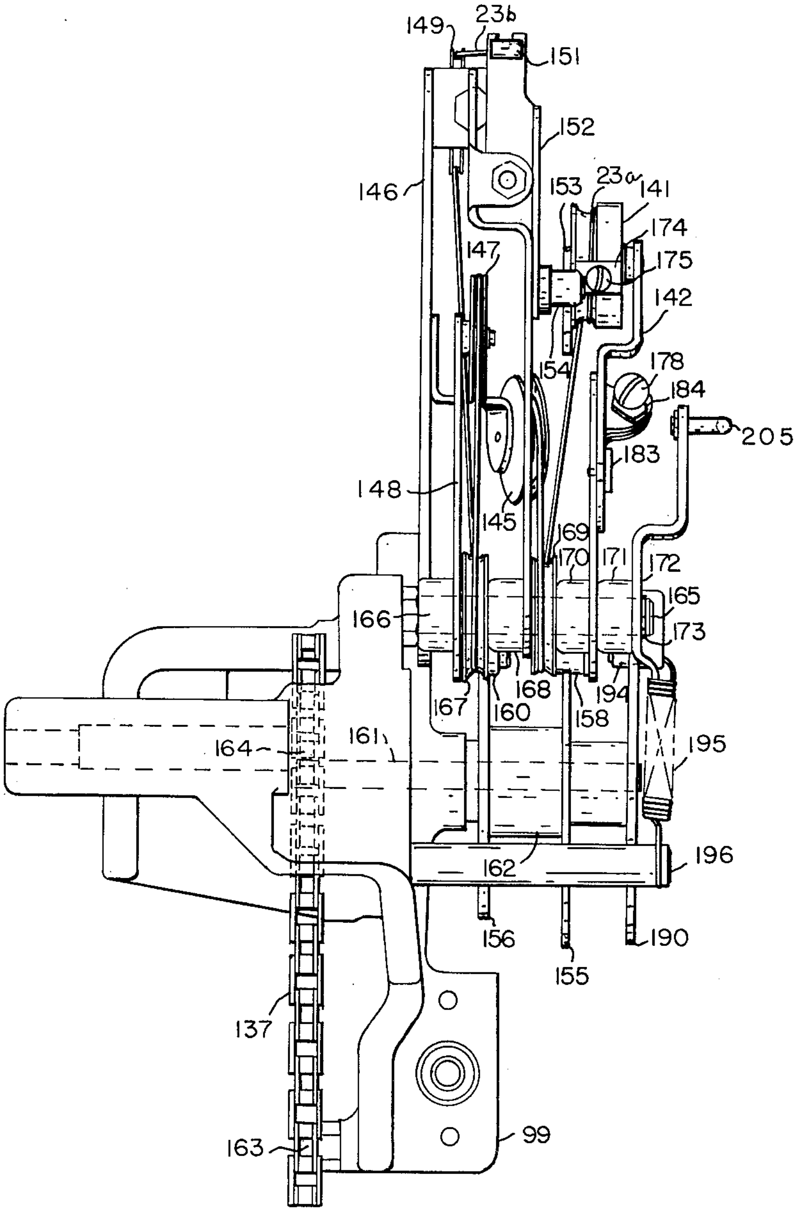
Fig. XXIX
INVENTOR.
LAWRENCE S. WILLIAMS
BY
Marshall, Marshall & Yeasting
ATTORNEYS Aug. 14, 1962 L. S. WILLIAMS 3,049,287
CHART READING MECHANISM
Filed Nov. 15, 1957 13 Sheets-Sheet 13
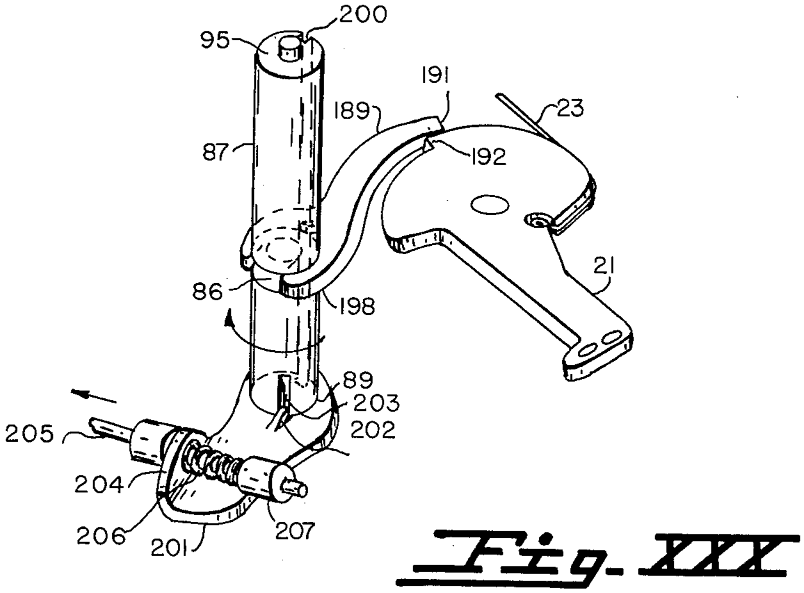
Fig. XXX
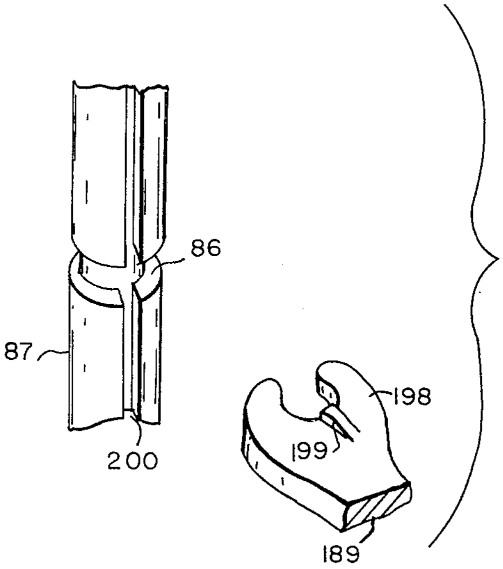
Fig. XXXI
INVENTOR.
LAWRENCE S. WILLIAMS
BY
Marshall, Marshall & Yeasting
ATTORNEYS

3,049,287
CHART READING MECHANISM

Lawrence S. Williams, Toledo, Ohio, assignor, by mesne assignments, to Toledo Scale Corporation, Toledo, Ohio, a corporation of Ohio Filed Nov. 15, 1957, Ser. No. 696,784
4 Claims. (Cl. 235—1)

This invention relates to mechanical chart reading devices for use in connection with condition responsive instruments or mechanisms to sense the position of a condition responsive member and convert such information as received therefrom into a form suitable for operating indicating or recording devices.

As industrial processes and inventory control using condition responsive instruments become more and more exact there is a need for a corresponding increase in the accuracy of reading and recording the indications of the instruments. While the reading device constructed according to the invention may be applied to various types of condition responsive mechanism it is, for illustrative purposes only, described in connection with its use in a weighing scale for reading the graduations of a chart that moves according to the weight of a load being weighed and setting mechanism for visual display or recording of weight indications in digital form. The accuracy of a digital indication is limited only by the number of places into which the recording may be resolved. In order to get high accuracy it is necessary to graduate the chart with finely spaced graduations and the difficulty of reading, particularly by mechanical means, is thereby materially increased.

The basic reading device with which the invention is concerned is disclosed in copending application Serial No. 616,517 which was filed on October 17, 1956, the present application being a continuation-in-part of such copending application, and includes a plurality of cooperating permutation members which are individually urged in a direction to engage relatively raised and depressed surfaces of a chart and are retracted from engagement with the chart by means of a common pawl that selectively engages one of two notches in each of the permutation members so as to retract such members without disturbing their relative positions. The common pawl in fully retracted position locks the permutation members against relative motion so that notched peripheries of the members may be searched for aligned notches corresponding to the relative positions as determined by a permutation code.

The industrial weighing scale to which the reading device constructed according to the invention is applied, for illustrative purposes only, is provided with conventional so-called "unit weights" for increasing the load offsetting capacity.

Many weighing scales, such as the one shown and described in U.S. Patent No. 2,724,585 issued on November 22, 1955, to R. O. Bradley and C. H. Maurice, Jr., incorporate "unit weights" for increasing the load counterbalancing capacity of the scale without decreasing the sensitivity of indication given by the ordinary scale indicator. This is accomplished by means of positionable weights which are placed on the weighing scale mechanism, one at a time, and each of which increases the capacity of the scale by some fixed amount, e.g., 500, 1000, 2000 or 5000 pounds. In scales so equipped, the unit weights may counterbalance as much as nine-tenths of the total weighing capacity of the scale, the remaining portion being counterbalanced by automatic load counterbalancing mechanism and indicated by the regular scale indicator.

In weighing scales having an auxiliary, manipulative unit weight system, it has been customary to make the counterbalancing capacity of each unit weight exactly the same as the capacity of the automatic load counterbalancing means. Manipulation of the unit weight lifting mechanism places one or more unit weights into cooperative relation with the automatic load counterbalancing mechanism when a load to be weighed exceeds the automatic counterbalancing capacity.

Weighing scales of the electronic type also may be provided with auxiliary load mechanism or so-called electronic "unit weights," such as those shown and described in abandoned U.S. application Serial No. 580,324 filed on April 24, 1956, in the name of R. O. Bradley. An electronic weighing scale may include a load cell, a balanceable network that includes an electrical strain gage operatively connected to the load cell and that is adapted to be unbalanced in response to changes in load applied to the load cell, and a circuit that is connected to the network and that includes a feedback potentiometer having a constant resistance and a sliding contact and means for automatically varying the position of the sliding contact relative to the constant resistance to vary the output voltage of the circuit in accordance with the output voltage of the network, the output voltage of the network being in opposition to the output voltage of the circuit. The auxiliary "unit weight" load mechanism includes means for adding at least one fixed increment of voltage to the output voltage of the circuit to increase the capacity of the scale.

It is desirable that the value of the unit weight or weights, whether of the mechanical or electrical type, be added automatically to the weight figure selected by the reading device from the chart so that the full weight may be indicated by a recording machine, such as a printer, in one operation. For example, if a load weighing 6000 pounds is placed upon a unit weight-equipped weighing scale having a dial capacity of 5000 pounds, 5000 pounds of the load may be counterbalanced by a unit weight and 1000 pounds of the load may be counterbalanced by the ordinary automatic load counterbalancing mechanism and it is desirable that the 5000 pounds unit weight figure and the 1000 pounds automatic load counterbalancing figure be added together automatically so that the full weight of 6000 pounds may be indicated or recorded by indicating or recording devices in one operation.

It is, accordingly, the principal object of this invention to provide, in a mechanical chart reading device for use in connection with condition responsive instruments or mechanisms to sense the position of a condition responsive member and convert such information as received therefrom into a form suitable for operating indicating or recording devices, means for adding to such information additional, yet related, information, whereby integrated information is obtained automatically and may be indicated or recorded by such indicating or recording devices in one operation.

Another object of the invention is to provide, in a weighing scale having automatic load counterbalancing mechanism and selectively operated auxiliary load counterbalancing mechanism, reading means for setting indicating or recording devices according to the weight counterbalanced by the automatic load counterbalancing mechanism and according to the weight counterbalanced by the selectively operated auxiliary load counterbalancing mechanism, whereby an integrated weight figure is obtained automatically and may be indicated or recorded by such device in one operation.

A further object of the invention is to provide, in a mechanical chart reading device having means for integrating information from a plurality of sources, means for zero suppression, whereby the indication or recording of redundant zeros is avoided.

A still further object is to provide an accurate mechanical chart reading device that is adapted to integrate information from a plurality of sources and that is simple to operate, yet is of rugged and low cost construction.

Other objects and advantages will be apparent from the following description in which reference is had to the accompanying drawings.

A preferred form of the invention is illustrated in the accompanying drawings.

In the drawings:

FIGURE I is an eleveation of a weighing scale dial mechanism showing the location of the reading device and a recording device operated thereby as they are mounted on a weighing scale mechanism;

FIGURE II is a fragmentary schematic diagram to illustrate some of the operating principles of the device;

FIGURE III is a diametric view of the permutation members and the drive mechanism therefor to show their cooperation with each other and with the chart;

FIGURE IV is a horizontal section through the assembly of permutation members to show the cooperation between the permutation members and the drive therefor;

FIGURE V is a plan view of one of the permutation members to show its notch pattern;

FIGURE VI is a fragmentary plan view of the notched portion of another permutation member to show a second notch pattern;

FIGURE VII is a front elevation at reduced scale of a weighing scale chart suitable for use with the permutation reading device;

FIGURE VIII is an enlarged fragment of the graduated portion of the weighing scale chart illustrated in FIGURE VII;

FIGURE IX is a section at enlarged scale taken substantially along the line IX—IX of FIGURE VIII to illustrate the shape of the individual chart graduations;

FIGURE X is a section at enlarged scale taken along the line X—X of FIGURE VIII to show the shape of locating notches employed to locate the chart prior to taking a reading;

FIGURE XI is a table showing the permutation code used for each of the graduations of the chart;

FIGURE XII is an exploded view of locating mechanism employed to center the chart graduations prior to taking a reading so as to avoid any possibility of selector pins of the permutation members failing to properly engage the chart graduations;

FIGURE XIII is a plan view of the locating device;

FIGURE XIV is a vertical section along the line XIV—XIV of FIGURE XIII;

FIGURE XV is a plan view of a modified locating device;

FIGURE XVI is an elevational view of the locating device which is shown in FIGURE XV;

FIGURE XVII is an enlarged, elevational view of the device which is illustrated in FIGURE III with the addition of a supporting base and frame embodying adjusting and guiding means for the device and part of the means of the present invention for adding additional, yet related, information to the information received by such device from the chart;

FIGURE XVIII is an elevational view as seen from a position along the line XVIII—XVIII of FIGURE IV looking in the direction indicated by the arrows;

FIGURE XIX is an elevational view as seen from a position along the line XIX—XIX of FIGURE IV looking in the direction indicated by the arrows;

FIGURE XX is a plan view of the device which is illustrated in FIGURE XIX;

FIGURE XXI is an end elevational view of the device which is illustrated in FIGURE XIX;

FIGURE XXII is an enlarged vertical, sectional view taken substantially along the line XXII—XXII of FIGURE XX;

FIGURE XXIII is a fragmentary elevational view of one of the spacers which are shown in FIGURE XVII illustrating modified structure having localized bearing areas to reduce friction between spacers and permutation disks;

FIGURE XXIV is a perspective view of a modification of the drive for the chart reading device which is shown in FIGURE II;

FIGURE XXV is a perspective view of a modification of the drive which is shown in FIGURE XXIV illustrating means for effecting repeat recording;

FIGURE XXVI is a horizontal, sectional view taken along the line XXVI—XXVI of FIGURE XXV;

FIGURE XXVII is partly in elevation and is partly a schematic view showing mechanism for adding unit weight indication automatically into the chart reading device so that the full weight may be indicated or recorded by indicating or recording devices in one operation;

FIGURE XXVIII is an elevational view which is similar to FIGURE XXVII showing the complete chart reading device and the mechanism for adding unit weight indication into such device;

FIGURE XXIX is an end elevational view taken from a position substantially along the line XXIX—XXIX of FIGURE XXVIII looking in the direction indicated by the arrows;

FIGURE XXX is a fragmentary perspective view of part of the chart reading device which is illustrated in FIGURE XXVIII showing means for zero suppression to avoid the indication or recording of redundant zeros; and FIGURE XXXI is a fragmentary, enlarged and exploded view of the device which is illustrated in FIGURE XXX.

These specific figures and the accompanying description are intended merely to illustrate the invention and not to impose limitations on its scope.

For the purpose of illustration, the chart reading device is shown in connection with an ordinary dial type weighing scale. Such a scale comprises a dial housing 1 that contains automatic load counterbalancing and indicating mechanism which includes a chart 2 that is rotated through increments of angle that are proportional to increments of weight applied to the scale. The chart housing 1 is mounted on the top of a scale column 3 of which only the top portion is shown in FIGURE I.

The chart reading mechanism is contained within a housing 4 attached to the dial housing 1 and is connected through a conduit 5 to a printer or other utilization indication or recording device 6 which is to be operated according to the scale readings. The chart 2 has on its face a series of graduations 7 that are visible through a magnifying lens 8 to provide visual indications of the load on the scale. The face of the chart 2 is also provided with molded graduations or indicia 9 consisting of relatively raised and depressed surfaces, as shown in greater detail in FIGURES VIII and IX constituting the indicia that are sensed by the reading device contained within the housing 4.

FIGURE II shows in schematic form one of each of the essential elements of the reading device while FIGURE III shows a complete assembly of the sensing and selecting portions of the reading device. Referring first to FIGURE II, a reading of the chart 2 is taken by first advancing a series of sensing pins 10, one of which is shown, by spring-urged rotation of permutation disks 11 to positions at which they are arrested by engagement of the sensing pins 10 with the indicia 9 of the chart 2. Prior to the engagement of the sensing pins 10 with the indicia 9, a cam 12 forming part of a drive member 13, through engagement with a roller 14, drives a resiliently mounted finger 15 toward the chart until its tip 16 engages a row of raised teeth 17 and comes to rest either between adjacent teeth or on the crest of a tooth. Continued motion of the cam follower 14 turns a rubber tired wheel 18 in a direction tending to move the chart 2 so that the tip of the finger 16, if it had lodged on a crest of a tooth 17, is permitted to enter the space between two of the teeth and thus locate the chart 2. If the tip 16 were already engaged in a space between two of the teeth 17 the wheel slips leaving the chart 2 in position with the corresponding graduation centered in the path of the sensing pins 10. Thus, the pins 10 either enter squarely into the spaces between indicia 9 or onto the crests depending upon the coding of the indicia for that particular graduation.

After the permutation disks 11 are retracted, without disturbing their relative positions as determined by the engagement of the sensing pins 10 with the chart 2, search pawls 20, one for each decade, carried on pawl arms 21 and each cooperating with four of the permutation disks 11 search notches 22 in the peripheries of the permutation disks 11. As each pawl finds aligned notches in its set of four permutation disks 11 it stops the pawl carrier in a position corresponding to the particular graduation of the chart being sensed. The stopped pawl carriers, through their connections through cables 23, position an indicating or recording device according to the sensed graduation.

The movement of the drive member 13 is produced and controlled by a connecting rod 24 and crank 25 driven by a motor 26 equipped with controls to cause it to drive the crank 25 through one revolution for each start signal.

The sequence of steps in thus taking a reading from the chart 2 is to energize the motor such that it turns the crank 25 and thus oscillates the drive member 13. This oscillation first drives the cam follower 14 and finger 15 toward the chart to locate it with a graduation accurately in line with the sensing pins 10. During the oscillation of the drive member 13 the permutation disks 11, four for each decade, are driven so that their respective pins 10 engage the chart and then are retracted without disturbing their relative positions with respect to each other to a locking position at which they are held while the searching pawls 20, one for each group of four permutation disks or one for each decade, search the peripheries of the permutation disks 11 for the aligned notches. Upon finding the aligned notches the pawls stop the respective pawl carriers 21 in proper indicating positions.

The whole combination or assembly of permutation disks and drive members is shown in greater detail in FIGURE III. The complete stack up of permutation disks 11 for a four place number includes sixteen of the permutation disks 11, four pawl carriers 21, and enough spacers 27 to separate each of the permutation disks 11 from its neighbor or from a pawl carrier 21 as the case may be. Thus, sixteen permutation disks 11 and four pawl carriers 21 plus an extra spacer at the top of the stack requires a total of twenty-one spacers 27. Each of the spacers is provided with bifurcated ears 28 and 29 adapted to slip into notches in support rods of a frame with the rods holding the spacers in alignment and in spaced relation. Each of the spacers also has an inwardly directed notch 30 on the side facing the chart that terminates in a narrow slot 31 adapted to fit into a corresponding groove cut in an axle 32 on which the permutation disks 11 and pawl carriers 21 are journaled. Thus, each of the spacers 27 has a three point support so as to separate the permutation disks and still allow them to move easily as may be required in sensing the chart or in carrying the pawls 20 along the notched peripheries of the permutation disks 11.

The sensing pins 10 each have a pointed end 33 that is sharp enough to enter the spaces between alternate graduations and yet blunt enough to avoid cutting the chart material and has its other end curled into a circular loop 34 that is a close sliding fit in a hole cut in the connected permutation disk 11 so that the pin moves in the manner of a flat ball and socket joint. This particular construction keeps the thickness of the permutation disk and pin a minimum so that it may fit between closely spaced adjacent spacers 27.

The permutation disks 11 are continually urged in a direction tending to drive the sensing pins 10 against the chart by spring teeth 35 of a comb spring 36 that is carried on a common pawl bail 37. The ends of the spring teeth 35 engage notches 38 in the permutation disks. Movement of the permutation disks 11 under the influence of the springs 35 is limited by a common pawl 40 that is carried in the bail 37 and arranged to selectively engage either of two notches 41 or 42 of each permutation disk 11 and lock it in position when the pawl engages hook-like portions 43 (FIGURE IV) of the bifurcated ears 29 as the bail 37 is urged counterclockwise, as seen in FIGURES III and IV, by a return spring 44 attached to its lower end. The common pawl 40 is held seated in pivot notches 45 of the bail 37 by a plurality of small springs 46 forming part of the comb spring 36 and attached to the bail 37. The pawl 40 is urged into engagement with the notches 41 or 42 by a light spring 47 also attached to the bail 37. The radial wall of notch 42 is raised at 42*a* (FIGURE V) as a limit stop guard to avoid complete disengagement of the pawl 40 should it attempt to jump the notches 41 and 42.

In operation, as the drive member 13 is swept clockwise as seen in FIGURE III or IV it collects the pawl carriers 21 from their previous positions and finally engages an upwardly directed stud 48 carried in an upper arm 49 of the bail 37 so as to drive the bail clockwise through a small distance against the tension of the return spring 44. During the initial movement of the bail 37 it and the permutation disks 11 move as a unit since the disks are held between the spring teeth 35 engaging the notches 38 and the pawl 40 engaging the notches 41 or 42. As the sensing pins 10 engage the chart 2 and drive it against a backup roller 50 the motion of the permutation disks 11 is arrested. The spring teeth 35 yield as the bail 37 continues and the pawl 40 leaves the notches 41 or 42 and slides part way along the smooth periphery of the permutation disks 11 between the notches 41 and 38. This motion is just far enough to make sure that the common pawl 40 is out of the notches. On the return motion of the drive member 13, the spring 44 pulls the common pawl bail 37 counterclockwise so that the common pawl 40 may enter the aligned ones of the notches 41 or 42 in each of the permutation disks according to whether the disk had been advanced by its pin finding a low spot in the chart or whether it had been arrested in the first position with the pin on the crest of a graduation. The continued motion with the common pawl 40 engaged in the permutation disks drives the disks in retracting motion until the common pawl 40 seats behind the hook-like portions 43 of the spacer ears 29. At this point the motion of the common pawl bail 37 is arrested and the permutation disks 11 are all locked in position.

Continuing motion of the drive member 13 allows the pawl carriers 21 to follow as urged by their drive spring 52, one of which is shown in FIGURE IV connected to its cable 23. The pawl carriers 21 move until their pawls 20 find aligned notches in a particular combination of permutation disks with which they cooperate. It is to be noted that the position of the aligned notch may vary according to the relative positions of the group of disks cooperating with each pawl.

The sensing pins 10 adjacent the chart 2 are guided in slots 54 of a guide plate 55 that is attached to a frame support 56 that serves as the spacing support for the bifurcated ears 28 of the spacers 27. The slots 54 are just wide enough to admit the pins and, thus, accurately guide them closely adjacent the chart 2. As indicated in FIGURE IV, the guide plate 55 is adjustable relative to the frame support rod 56 and is controlled by an adjusting screw 57 that works in opposition to the common pawl bail return spring 44.

The return springs 52 may be the springs in the indicating or recording mechanism, such as a printer, to maintain tension on the cables 23 or if a commutator, not shown in the drawings, be attached to the pawl carriers 21 the springs 52 may be returned to the frame mechanism merely to apply tension to the cable 23 and do no other useful work. If a printer, as indicated in FIGURE I, is enclosed in the housing 6 the cables 23 are run through the conduit 5 from the selector mechanism in the housing 4.

Referring to FIGURE IV, each cable 23 is passed over an arcuate surface or periphery 58 of its pawl carrier 21 and its end is anchored in a hole 59 drilled through the pawl carrier. The spacers 27 hold the cable 23 from slipping off sideways. The radius of the arcuate surface 58 with respect to the axle 32 on which the paw carrier is journaled is selected according to the desired travel of the cable 23 for each increment of indication and the spacing of the notches 22 which determine the angular travel of the pawl carrier.

The permutation disks 11 are made with either of two notch patterns and the selector pawls 20 are arranged with one of its teeth advanced two notch spaces ahead of the other tooth. By thus varying the spacing of the pawl teeth and providing the two different patterns for the selector disks it is possible to secure at least eleven different combinations to provide different stopping points for the pawl 20. FIGURES V and VI show the two notch combinations for the permutation disks 11. In the type shown in FIGURE V the notched periphery is divided into twenty-three equal spaces with notches appearing in the first, third, fourth, sixth, ninth, tenth, twelfth, fifteenth, seventeenth, eighteenth, twentieth, and twenty-third spaces counting from left to right. Likewise the permutation pattern shown in FIGURE VI has notches appearing in the first, second, fifth, sixth, ninth, tenth, thirteenth, fourteenth, seventeenth, nineteenth, twenty-first, and twenty-third spaces. These particular notch combinations used in pairs with the offset pawl teeth operate according to the code set forth in FIGURE XI. This code is used in determining the location of the raised and depressed indicia for each of the graduations on the chart 2 to be sensed.

As shown in FIGURE VII, the chart 2 is an annular member carried on a spider 60 and having rows of graduations 61 on its marginal area. In order to allow for expansion and contraction of the chart 2 and the spider 60 relative to each other due to temperature changes, the spider 60 is slotted radially at 60*a* to loosely receive a rivet 61*a*, has openings 60*b* which loosely receive rivets 61*b*, and has an aperture 60*c* which fits snugly about rivet 61*c*. The rivets hold the chart 2 and the spider 60 together, the heads of the rivets being sheared off and the bodies of the rivets shown in section in FIGURE VII for clarity of illustration. The graduations or indicia are preferably molded in the face of the chart in the same manner as phonograph records are made with a plastic or other moldable layer 62 mounted on a metallic backing plate 63 and the graduations being formed in the plastic layer. The arrangement of graduations for a first fragment of the chart is illustrated in FIGURE VIII. This fragment, starting with the zero indicia of the chart, shows only those graduations in the units or lowest order decade and the row of teeth 17 for locating the chart. The teeth 17 along the marginal area of the chart cooperate with the locating finger 15 and have cross sections as shown in FIGURE X wherein each of the teeth is shown substantially as a conventional rack tooth. The tip 16 of the locating finger 15 is formed as a mating tooth so as to seat firmly in the spaces between the teeth 17.

The indicia 9 with which the sensing pins 10 cooperate are of generally similar shape except for being formed of heavier section inasmuch as the locating pins do not have to fit into the spaces between teeth that are located on adjacent graduations. The chart section shown in FIGURE VIII, as was mentioned, includes that portion starting at the zero graduation which is shown at the right-hand edge. Inasmuch as there are no significant figures to the left of the zero when indicating the zero graduation it is desirable that the indicator show or the recorder record a blank at this position. Therefore, the first graduation carries only the single raised portion in the bottom row or D row which, according to the chart shown in FIGURE XI, gives a blank for the output indication. The permutation disk combination for this graduation causes the aligned notch to appear at the end of the travel of the pawls 20 or at the last possible position at which an aligned notch may be formed. If an error is made such that the pawl does not find the aligned notch it overtravels and the recorder indicates such overtravel by recording some distinctive symbol such as "E," in place of a digit. The next graduation, a one, is indicated or denoted by a single raised indicia in the A row; likewise two is indicated by a single indicia in the C row; and the others follow according to the chart. It should be noted that the raised indicia of the chart cause the corresponding permutation disk 11 to be advanced counterclockwise one space as seen in FIGURE III or IV.

Other char combinations may be employed besides the particular code indicated. However, this particular code was selected in order that the number of different parts could be reduced. Thus, with the selected code two each of the permutation disks 11, shown in FIGURES V and VI, may be employed in each decade in combination with the offset pawl 20. If the offset pawl were not employed then each of the four permutation disks cooperating for each decade would have to have its own combination of notches which would make four different parts to be stocked instead of two.

The chart locating mechanism is illustrated in greater detail in FIGURES XII, XIII, and XIV. Referring to FIGURE XII, the cam follower 14 is mounted on the end of a forearm 65 that also carries, as a rigid part thereof, at its elbow end the drive wheel 18 that engages the chart to urge it forward so as to move any tooth 17 falling below the finger tip 16 out of the way and allow the tip 16 of the finger 15 to fall into the space between adjacent teeth 17. The arm 65 is pivotally connected through an elbow joint at the axis of the wheel 18 to a second arm 66 which in turn is pivoted on and, by a spring not shown, is continually urged clockwise about a pin 67 fixed in the framework of the scale. A spring 68 at the joint or elbow at the wheel 18 urges the forearm 65 clockwise with respect to the second arm 66 so that the wheel bears against the chart 2 before the elbow joint starts to turn. The spring urged movement of the forearm 65 relative to the second arm 66 is limited by a down turned ear 69 on the tail end of the forearm 65 that engages the front surface of the lower arm 66. Normally, the spring 68 rotates the forearm 65 to maintain the ear in engagement with the lower arm. However, when the mechanism is pushed toward the chart by the cam pushing on the cam roller 14 the lateral motion of the wheel 18 is arrested and the cam force against the cam follower 14 then rotates the arm 65 around its connection with the lower arm 66 thus producing the relative rotation of the wheel 18.

The finger 15 with its tip 16 is carried on the pin 67 and is urged toward the chart by a spring 70 acting between the lower arm 66 and the finger 15. The forward movement of the finger 15 is limited by a stop 71 erected from the rear portion of the lower arm 66 in position to engage the chart side of the finger 15.

FIGURE XIV is a section taken through the elbow joint between the arms 65 and 66 and shows a rubber tire 72 mounted on the wheel 18 so as to increase the tractive effort of the wheel on the chart.

In the operation of this mechanism the spring 68 is made stiff enough so that when the wheel 18 engages the chart it pushes the chart back against the backup roller 50 before the spring 68 yields and permits the arm 65 to turn relative to the arm 66. This insures that sufficient force is exerted against the chart to cause it to move even though the tip 16 of the finger 15 should be partially caught on the corner of the crest of a tooth. It is necessary that sufficient force be exerted at this time so that the tip of the finger 15 will slide across the crest of a tooth 17 and firmly engage in the valley against the side of the next tooth 17.

The chart locating mechanism includes a total of three springs, i.e., springs 68, 70 and the one, not shown, which continually urges arm 66 clockwise about pin 67. Such springs each require rather sensitive differential forces for good results. The number of the springs however, can be reduced from three to two by using the device which is illustrated in FIGURES XV and XVI, the modified device having the advantage that accuracy of differential forces need not be considered in mass production of the device.

Referring to FIGURES XV and XVI, the modified chart locating mechanism is alike in principle to the mechanism hereinbefore described and shown in FIGURES XII–XIV; however, it is shown in reverse orientation so that it can be driven by the motor 26, crank 25, connecting rod 24, and drive member 13 that are located to the left of the chart 2 instead of to the right of the chart 2 as illustrated in FIGURE II, i.e., the locating mechanism shown in FIGURES XII–XIV is driven by a right hand drive and the locating mechanism shown in FIGURES XV and XVI is driven by a left hand drive. Similar reference numerals in FIGURES XII–XIV and in FIGURES XV and XVI refer to parts which are alike in structure and in function.

The cam follower 14*a* is mounted on the end of a forearm 65*a* that also carries, as a rigid part thereof, at its elbow end a rubber tired drive wheel 18*a* that engages the chart 2 to urge it forward so as to move any chart tooth 17 falling below a finger tip 16*a* on a finger 15*a* out of the way permitting the tip 16*a* to fall into the space between adjacent chart teeth 17. The arm 65*a* is pivotally connected through an elbow joint at the axis of the wheel 18*a* to a second arm 66*a* which in turn is pivoted on and, by a spring 73, is continually urged counterclockwise about a pin 67*a* fixed in a stationary base 74 carried by the framework of the scale. The spring 73, which extends between a fixed point 75 on an anchor bracket 76 that is attached to the base 74 and a point 77 on the arm 65*a*, urges the forearm 65*a* counterclockwise with respect to the second arm 66*a* so that the wheel 18*a* bears against the chart 2 before the elbow joint starts to turn. The spring urged movement of the forearm 65*a* relative to the second arm 66*a* is limited by a down turned ear 69*a* on the tail end of the forearm 65*a* that engages the front surface of the lower arm 66*a*. Normally, the spring 73 rotates the forearm 65*a* counterclockwise to maintain the ear 69*a* in engagement with the lower arm 66*a*. However, when the centering device is pushed toward the chart by the cam pushing on the cam roller 14*a*, the lateral motion of the wheel 18*a* is arrested by the chart 2 and the cam force against the cam follower 14*a* then rotates the arm 65*a* around its elbow connection with the lower arm 66*a* thus producing the relative rotation of the wheel 18*a*.

The finger 15*a* with its tip 16*a* also is carried on the pin 67*a* and is urged toward the chart by a spring 70*a* acting between the lower arm 66*a* and the finger 15*a*. The forward movement of the finger 15*a* is limited by a down turned ear 78 on the finger 15*a* in position to engage the wheel 18*a*. Rearward movement of the finger 15*a* is limited by an end 79 of the spring 70*a* being pushed against face 80 of the lower arm 66*a*. The pin 67*a*, as best shown in FIGURE XVI, functions to pivotally support both the finger 15*a* and the lower arm 66*a*, the finger 15*a* and the arm 66*a* having flat-bottomed, U-shaped ends pivoted on the pin 67*a*. Similarly, the forearm 65*a* is pivotally connected through the elbow joint at the axis of the wheel 18*a* to the second arm 66*a* at a flat-bottomed, U-shaped end on the forearm, such elbow joint including a bolt 81 and a nut 82 attached to the lower arm 66*a* with a spacer 83 keeping the arms of the U-shaped end of the forearm apart, the forearm being rockable about the axis of the bolt 81.

The spring 73 is made stiff enough to that when the wheel 18*a* engages the chart it pushes the chart back against the backup roller 50 before the spring 73 yields appreciably and permits the arm 65*a* to turn relative to the arm 66*a*. This insures that sufficient force is exerted against the chart to cause it to move even though the tip 16*a* of the finger 15*a* should be partially caught on the corner of the crest of a chart tooth 17.

In operation, pressure of the cam 12 against the cam follower 14*a* moves the forearm 65*a* toward the chart. The forearm 65*a* carries with it the wheel 18*a* which is fixed to the forearm, the finger 15*a* which has its down turned ear 78 spring urged against the wheel 18*a*, and the lower arm 66*a* which has its front surface in contact with the spring urged, down turned ear 69*a* on the forearm 65*a*. The finger tip 16*a* on the finger 15*a* contacts the chart first, the finger 15*a* then pivoting counterclockwise about the axis of the pin 67*a* in opposition to the spring 70*a* until the end 79 of the spring 70*a* contacts the abutment face 80 of the lower arm 66*a*. Movement of the finger 15*a* relative to the lower arm 66*a* is quite limited. Since the fixed point 75 at the end of the spring 73 is close to the pin 67*a*, the initial movement of the locating device toward the chart may be accomplished with little force, the spring 73 being stretched only slightly during the cycle before the wheel 18*a* contacts the chart.

Next, the rubber tired wheel 18*a* contacts the chart and its lateral motion soon is arrested by the chart 2 which is backed up by the backup roller 50. The cam force then rotates the arm 65*a* around its elbow connection with the lower arm 66*a* producing the relative rotation of the wheel 18*a*, the spring 73 at this point yielding appreciably. Rotation of the wheel 18*a* moves the chart 2 so as to move any chart tooth 17 falling below the finger tip 16*a* on the finger 15*a* out of the way permitting the spring urged tip 16*a* to fall into the space between adjacent chart teeth 17. Once the tip 16*a* falls into the space between adjacent chart teeth 17, the chart can be moved no further about its axis of rotation by the wheel 18*a* and the wheel 18*a* merely slips on the surface of the chart until it is withdrawn, it being withdrawn in a very short time, since the chart graduation sensing cycle of the reading device is of short duration. Of course, it may happen that the chart is so located initially by the condition responsive mechanism that the finger tip 16*a* is moved directly into the space between adjacent chart teeth 17. Under such circumstances, the chart cannot be moved about its axis of rotation by the wheel 18*a* and the wheel merely slips on the surface of the chart. However, in any case, the wheel 18*a* functions to push the resilient chart back against the backup roller 50 in position to be sensed by the sensing pins 10.

The chart locating mechanism operates ahead of the sensing pin 10 movement to shift the chart 2 from any half graduation position to the next full graduation so that a sensing pin 10 always firmly engages either the crest of a raised portion of a chart graduation or accurately enters a depressed portion. Upon withdrawal of the cam 12, the cam roller 14*a* follows along under the urging of the spring 73, the spring 73, thus, functioning both as a return spring for the roller 14*a* and its associated parts and also as a resilient means which gives way to allow the elbow connection to work at the appropriate time. The chart locating mechanism may be summarized in principle as a device employing friction means, i.e., the rubber tired wheel 18*a*, for tangentially urging the chart, after it has been positioned approximately by condition responsive mechanism, to a centered reading position. The chart locating mechanism shown in FIGURES XII–XIV and the modified structure shown in FIGURES XV and XVI employ the same such friction means, the friction means eliminating the possibility of error should a sensing pin 10 slide off a raised portion of a graduation because the chart has stopped halfway between two graduations.

The whole combination or assembly of permutation disks, their drive members, and their supporting frame is shown in detail in FIGURE XVII. Sixteen permutation disks 11, four pawl carriers 21, and twenty-one spacers 27 are illustrated in FIGURE XVII. The bifurcated ears 28 (FIGURE III) of the spacers 27 (FIGURE XVII) are adapted to slip into notches 84 in the square support rod 56 of a frame 85 and the bifurcated ears 29 of the spacers 27 are adapted to slip into notches 86 in a round support rod or post 87 of the frame 85, the rods 56 and 87 holding the spacers in aligned and in spaced relationship. As hereinbefore described, each of the spacers 27 also has an inwardly directed notch 30 on the side facing the chart 2 that terminates in a narrow slot 31 adapted to fit into a corresponding groove cut in the axle 32 on which the permutation disks 11, the drive member 13, the bail 37 carrying the comb spring 36, and the pawl carriers 21 are journaled. Thus, each of the spacers 27 has a three point support so as to separate the permutation disks and still allow them to move easily as may be required in sensing the chart or in carrying the pawls 20 along the notched peripheries of the permutation disks 11.

The frame 85 includes a horizontal lower plate 88 which serves as a support for the rods 56 and 87, there being lower shoulders 89 on the rods which bear upon the lower plate, and which also serves as a support for a post 90 having a lower shoulder 91 that also bears upon the lower plate. A tenon which is not shown but which is on the lower end of the axle 32 is received in a flat member 92 secured to the lower plate 88, there being a shoulder on the tenon which supports the axle from the lower plate and a pair of washers 93 loose on the lower end of the axle between the lower part of the rockable drive member 13 and the flat member 92. The axle 32, rods 56 and 87, and post 90 function as four spacers to support an upper plate 94 that is held in place on upper shoulders 95 of the axle, rods, and post by nuts 96.

Integral with the flat member 92 is a vertical, cone-shaped bottomed post or pin 97 which extends through the lower plate 88 well below the plate into a hole 98 in a base 99 that is suitably mounted within the housing 4 (FIGURE I). The base 99 has a vertical slot 100 which communicates with the hole 98 and an integral boss 101 which is split by the slot 100. A cap screw 102 threaded horizontally through the boss 101 functions to adjust the width of the slot 100 and, therefore, the size of the hole 98. When the screw 102 is loosened, the post 97 carrying the frame 85 can be lifted out of the hole in the base 99. Hence, the reading device including the frame 85 and the stack of permutation disks and their drive members are removable from the base 99 as a unit assembly.

Precise adjustment and proper guiding of the reading device relative to the chart 2 is very important in attaining high accuracy of reading and recording the indications of condition responsive instruments. The frame 85 carrying the reading device is adjustable in a vertical path by loosening the screw 102 so that the pin 97 is free to slide in the hole 98 and by turning a cone-pointed adjustment screw 103, threaded into the base 99, until the cone point 104 on the screw 103, which cooperates with the cone-shaped bottom on the pin 97, moves the pin 97 upwardly in the hole 98 or permits it to move downwardly in the hole depending upon which direction the screw 103 is turned. After the frame 85 is located in its proper vertical position, the screw 102 is retightened and a lock nut 105 on the adjustment screw 103 is tightened.

The frame 85 carrying the reading device also is adjustable about the axis of the pin 97 by loosening the screw 102 so that the pin 97 is free to slide in the hole 98 and by turning one way or the other an adjustment screw 106 that is threaded at 107 into the base 99. The screw 106 is of the double shouldered type, one shoulder cooperating with the outer surface of a bracket 108 depending from the lower plate 88 of the frame 85 at an inverted U-shaped slot 109 in the bracket through which slot the screw 106 extends, and the other shoulder cooperating with the inner surface of the bracket 108 at the slot 109 to form a push-pull connection having a line of action so directed that the frame 85 turns when the adjustment screw 106 is turned. After the frame 85 is located in its proper position, the screw 102 is retightened.

Referring to FIGURE XVIII, as hereinbefore descirbed, the sensing pins 10 adjacent the chart 2 are guided in slots 54 of the guide plate 55 that is attached to the frame support 56. The slots 54 are just wide enough to admit the pins and, thus, accurately guide them closely adjacent the chart 2. As indicated in FIGURES IV and XVIII, the guide plate 55 is adjustable relative to the frame support rod 56 by being pivotal about the axis of a horizontal shoulder screw 110 that is threaded into the support 56 and is controlled by the adjusting screw 57 that works in opposition to the common pawl bail return spring 44. The axis of the shoulder screw 110 is near to the upper one of the sensing pins 10.

The backup roller 50 also is adjustable relative to the chart 2; it is mounted for rotation on a bracket 111 that is held in a groove 112 in a plate 113 by means of a pair of adjustment screws 114, the bracket being loosely secured to the ends of the adjustment screws 114, which protrude through holes in the bracket, by clips 115 as indicated in FIGURES XX and XXI. That is, the ends of the adjustment screws 114 and the clips 115 form push-pull connections, the bracket 111 being pulled horizontally into the groove 112 by the clips 115 when the adjustment screws 114 are turned in a direction which removes the screws from the plate 113 and the bracket 111 being pushed out of the groove 112 by shoulders 116 on the adjustment screws 114 when the screws are turned in the other direction. The adjustment screws 114 are threaded through the plate 113 as shown in detail in FIGURE XXII and turn with difficulty because of short, stiff pieces of wire 117 that are urged resiliently by springs 118, attached to the plate 113, against the adjustment screws 114 at right angles to the axes of the screws. This tends to keep the adjustment screws in their adjusted positions. The plate 113 carrying the backup roller 50 and the adjustment screws 114 is mounted as a unit assembly by means of screws 119 to framework 120 of the dial housing 1.

The gap between the back of the chart 2 and the backup roller 50 (see FIGURE IV) can be varied by turning both of the adjustment screws 114 which slides the bracket 111 back or forth horizontally in the groove 112. Also, either one of the adjustment screws can be turned to tilt the backup roller 50 vertically, i.e., to tilt the roller relative to the chart 2.

In adjusting the reading device to locate it properly relative to the chart 2 to attain the highest accuracy in reading the chart, first, the gap between the backup roller 50 and the back of the chart 2 is adjusted, as hereinbefore described, to the width of a gauge. The size of the gap depends on such factors as the stiffness of the chart 2 and the distances that the sensing pins 10 are driven toward the chart. After the gap is once chosen experimentally as the one which gives optimum performance, a gauge is made to quickly determine the size of the gaps in subsequent production of the reading devices.

Second, the backup roller 50 is tilted, as hereinbefore described, to get the common pawl 40 aligned in one of the two notches 41 or 42 of each permutation disk 11. A blank part of the chart 2 is used for this adjustment. To make the adjustment, the drive member 13 is turned clockwise as viewed in FIGURES III and IV until the sensing pins 10 engage such blank part of the chart 2 and drive it against the backup roller 50 and until the common pawl 40 leaves the notches 41 or 42 and slides part way along the smooth periphery of the permutation disks 11 between the notches 41 and 38. The backup roller 50 then is tilted until the edge of the common pawl 40 appears to be parallel with the aligned ones of the notches 41 or 42 in each of the permutation disks. The drive member 13 then is allowed to return so that the spring 44 pulls the common pawl bail 37 counterclockwise so that the common pawl 40 may enter the aligned ones of the notches. The common pawl 40 should seat squarely in the bottoms of the aligned ones of the notches as illustrated in FIGURE IV. If it does not, the process is repeated and the backup roller 50 is tilted relative to the chart 2 by trial and error until the pawl 40 aligns with the notches properly.

Third, the frame 85 carrying the assembly of permutation disks and drive members is adjusted both vertically and about the axis of the post 97. One of the molded graduations or indicia 9 on the chart 2 is made extra thin and long and serves as an indexing ridge for this adjustment. To make the adjustment, the frame 85 is adjusted vertically, as hereinbefore described, until the upper one of the sensing pins 10 is at about the same elevation as the top of the indexing ridge 9 and then is adjusted about the axis of the post 97, as hereinbefore described, until such upper one of the sensing pins 10 is aligned horizontally with the top of the indexing ridge 9, i.e., until such sensing pin 10 is in close juxtaposition with such ridge 9.

Finally, the guide plate 55 is rocked about the axis of the shoulder screw 110, as hereinbefore described and as indicated by the double-ended arrow in FIGURE XVIII. Such axis is near to the upper one of the sensing pins 10 as illustrated in FIGURE XVIII. This angular adjustment is made to align the rest of the sensing pins, the upper one of the pins being previously aligned, with the indexing ridge 9 so that the row of pins is parallel with such ridge.

The adjustments for the chart reading device and for the backup roller 50 provide in a simple structure easily operable means for vertical, horizontal and angular positioning of the sensing pins 10 relative to the condition responsive chart 2 and for locating and positioning the backup roller 50 relative to the chart to obtain optimum performance from the reading device.

The stack of permutation disks 11 and spacers 27 shown in FIGURE XVII comprise flat disks and spacers which contact each other over relatively large bearing areas. Such flat spacers 27 may be modified and formed as shown in FIGURE XXIII wherein a spacer 27a is illustrated having localized bearing areas 121 to reduce friction between spacers and disks.

The reading device may be adapted selectively to be locked indefinitely, after once having sensed the position of the chart 2, to "remember" the information as received from the chart for repeat recording of such information by means of the structure shown in FIGURES XXV and XXVI. The drive for the chart reading device which is shown in FIGURE II is illustrated in a modified form in FIGURE XXIV. Similar reference numerals in FIGURE XXIV and in FIGURE II refer to parts which are alike in structure and in function.

Referring to FIGURE XXIV, the movement of the drive member 13 (FIGURE II) is produced and controlled by a connecting rod 24a and crank 25a driven by a cam 122 which is fixed to a cam shaft 123 that is gear-connected to a motor (not shown), the cam shaft 123 being suitably journaled in the base 99 and the motor being hung from the base 99. The physical location of the cam 122 and the motor is at that part of the base which is shown broken away in FIGURE XVII to the right of the stack of disks 11 and spacers 27. The crank 25a is pivoted on a pin 124 carried by the base 99 and is constantly urged toward the cam 122 by means of a return spring 125 which interconnects the base 99 and the crank, a roller 126 on the crank following about the periphery of the cam 122. The motor turns the cam 122 in the direction indicated by the single-ended arrow in FIGURE XXIV through one revolution for each start signal, the motor being equipped with controls to cause it to turn one revolution only for each start signal. Clockwise turning of the cam 122, as viewed in FIGURE XXIV, drives the crank 25a back and forth as indicated by the double-ended arrow to oscillate the drive member 13 as hereinbefore described in connection with the drive shown in FIGURE II.

Ordinarily, the motor 26 (FIGURE II) which causes oscillation of the drive member 13 also may drive the utilization device 6 (FIGURE I). For example, if the device 6 is a printer, the motor can first cause a complete oscillation of the drive member 13 so that the chart reading device can set the printer according to the weight of a load upon the weighing scale and then the motor can operate printing mechanism to make a print of such weight all in one synchronized operation. Every time that the motor is operated, the reading device senses the chart and sets up the printer and the printer then is operated to make a print. In some instances, however, it is desirable to make repeat prints of a single weight value with the reading device locked indefinitely to "remember" the information as received from the chart 2. Mechanism for repeat recording or printing is shown in FIGURES XXV and XXVI. Similar reference numerals in FIGURES XXIV and in FIGURES XXV and XXVI refer to parts which are alike in structure and in function.

Referring to FIGURES XXV and XXVI, the drive member 13 (FIGURE II) may be driven by means including a crank 25b which is pivoted on a pin 124b that is carried by a frame (not shown). Also pivoted on the pin 124b is a bracket 127 which carries a roller 126b that is adapted to be driven by a cam 122b (FIGURE XXVI). The crank 25b carries at one end thereof a bell crank 128 which is pivoted at 129 to the crank 25b. Adjustably attached to the bell crank 128 is a latch 130 having an abutment surface 131 which locks the bracket 127 in its position shown in FIGURES XXV and XXVI. In such latched position of the bracket 127, the cam 122b drives the crank 25b through the bracket 127, which cannot move relative to the crank 25b when it is latched, in the same manner as the cam 122 drives the crank 25a (FIGURE XXIV).

When it is desired to make a repeat recording or a print, a solenoid 132, which is carried by the crank 25b, is energized to pivot the bell crank clockwise as viewed in FIGURE XXVI. This moves the abutment surface 131 of the latch 130 away from its cooperating position with the bracket 127. This, in turn, breaks the driving connection from the cam 122b to the crank 25b because the bracket 127 is free to pivot about the axis of the pin 124b under such circumstances. Rotation of the cam 122b then merely rocks the bracket 127 about the axis of the pin 124b, a tension spring 133, interconnecting the bracket 127 and the crank 25b, constantly urging the roller 126b, carried by the bracket 127, against the periphery of the cam when the cam falls back. When the solenoid 132 is deenergized, a compression spring 134 returns the latch 130 to the position shown in FIGURES XXV and XXVI.

In operation, to make a single print of the weight of a load upon the scale, the start signal is given to the motor which then turns one revolution and drives the chart reading device, which sets up the printer, and also drives the printer to make a print. To make a repeat print of such weight of the load upon the scale, another such start signal is given to the motor and simultaneously therewith the solenoid 132 is energized to unlatch the bracket 127 allowing the chart reading device to remain stationary while the motor operates the printer to make a second print of the weight value previously set up in the printer. An unlimited number of additional repeat prints can be made in a similar manner, i.e., the chart reading device, after sensing the chart, selectively can be locked indefinitely to remember the information as received from the chart for repeat recording of such information.

It is sometimes desirable to add selectively to the information received by the chart reading device from the chart additional, yet related, information, and indicate or record the information by suitable indicating or recording devices in one operation. This may be accomplished by the mechanism shown in FIGURES XXVII–XXIX which is described in connection with its use, for illustrative purposes only, in connection with a weighing scale. It should be understood that the chart reading device per se has utility in connection with condition responsive instruments in general to sense the position of a condition responsive member and convert such information as received therefrom into a form suitable for operating indicating or recording devices and that the mechanism illustrated in FIGURES XXVII-XXIX has utility in automatically adding additional information, from any source as long as it is related information, to the information as received from the condition responsive member, whereby integrated information may be indicated or recorded in one operation.

The mechanism shown in FIGURES XXVII–XXIX has utility, in connection with a weighing scale, in adding unit weight indication into the chart reading device so that the value of the unit weight or weights is added automatically to the weight figure selected from the chart 2, whereby the full weight can be indicated or recorded in one operation. The disclosure of U.S. Patent No. 2,724,585 issued on November 22, 1955 to R. O. Bradley and C. H. Maurice, Jr., hereinbefore referred to, is incorporated herein by reference. When the unit weight mechanism shown and described in such patent is operated, a cup member drives a unit weight indicating chart plate that is rigidly attached to the cup and that extends to a position within the field of view of a magnifying lens to give a visual indication of the amount of load offset by the unit weights. A fragment corresponding to part of such cup member is shown at 135 in FIGURE XXVIII and attached thereto is a fork 136 having its tines extending through links in a continuous chain 137. Each time that a unit weight is added, the capacity of the scale is increased by a fixed amount equal to the capacity of the chart 2 and the fork 136 moves downward one step to move the chain 137 clockwise as viewed in FIGURE XXVIII. The weights are applied in combinations to provide nine increases to the capacity of the chart 2, each increase being equal to the capacity of the chart. For the purpose of illustration only, the chart 2 is given a dial capacity of 5000 pounds and each of the unit weights is given a counter-balancing capacity of 5000 pounds so that the dial capacity of 5000 pounds plus the 45,000 pounds capacity provided by the unit weights gives a total scale capacity of 50,000 pounds.

In the arrangement for adding the unit weight indication into the chart reading device shown in FIGURES XXVII–XXIX, two extra permutation arms, a 1000 pounds differential arm 138 and a 10,000 pounds differential arm 139, are added to the assembly or stack of permutation disks and drive members. The extra arms 138 and 139 are generally similar in shape to the pawl arms 21, except that they do not carry search pawls 20 and each have two cables attached thereto, one pulling clockwise and the other counterclockwise, instead of only one cable. Like the pawl arms 21, the extra arms 138 and 139 each have spacers 140 in the stack in juxtaposition therewith.

In this arrangement, the lower three pawl arms 21 are not changed in any way and function, as hereinbefore described, to set up, through their connections through cables 23, the units, tens and hundreds, respectively, in the indicating or recording device according to the sensed graduations. Such lower three pawl arms 21 are shown in FIGURE XXVIII as being connected to their drive springs 52 which may be the springs in recording mechanism, such as a printer, to maintain tension on the cables 23 or if a series of commutators, not shown, be attached through brushes on the pawl carriers 21 to the pawl carriers the springs 52 may be returned to the frame mechanism merely to apply tension to the cables 23 and do no other useful work as hereinbefore described. The upper or thousands indicating (1000 decade) pawl arm 21 (FIGURE XXVII), however, is modified by having its cable 23*a* led over an idler pulley 141 mounted on top of a first bell crank 142 and led back to the 1000 pounds differential arm 138 so as to pull the 1000 pounds arm clockwise as viewed in FIGURE XXVII. This arrangement is in contrast to an unmodified pawl arm 21 shown in FIGURE IV having its cable 23 connected directly to its spring 52. Clockwise movement of the 1000 pounds arm 138 pulls a cable 23 attached to the spring 52 (FIGURE XXVII) to the right to set up the digit in the thousands indication in the indicating or recording device. In other words, clockwise movement of the modified upper pawl arm 21 as viewed in FIGURE XXVII, instead of pulling on its spring 52 directly as shown in FIGURE IV, pulls on its spring 52 indirectly through its operative attachment to the spring 52 through its cable 23*a* and the 1000 pounds differential arm 138. Before being led over the idler pulley 141 the cable 23*a* is first led over an idler pulley 143 rotatably mounted in a bracket 144 depending from the upper plate 94 of the frame 85 and then over another idler pulley 145 rotatably mounted on a frame member 146 erected from the base 99.

When the chart reading device is operated, the 1000 pounds differential arm 138 will exactly reproduce the movements of the upper or thousands indicating pawl arm 21 operatively attached thereto and the cable 23 attached to the arm 138 will position the recording mechanism attached thereto just the same as though the cable 23 were attached directly to the upper pawl arm 21. However, if the idler pulley 141 on top of the first bell crank 142 is moved away from the stack of permutation disks 11, by rocking the bell crank 142, while the upper pawl arm 21 is locked, the 1000 pounds arm 138 will move additionally thus increasing the value of the digit in the thousands indication already set up in the indicating or recording mechanism by the selection of the weight from the chart 2.

The 10,000 pounds arm 139 has a cable 23*b* attached thereto which is led over an idler pulley 147 mounted on top of a second bell crank 148 and which is eventually led over an idler pulley 149 carried by a horizontal extension 150 of the frame member 146 to a fixed connection 151 on top of a movable vertical arm 152. When the idler pulley 147 on top of the second bell crank 148 is moved away from the stack of permutation disks 11, by rocking the bell crank 148, the 10,000 pounds arm 139 will move clockwise to draw the cable 23 attached thereto to the right as viewed in FIGURE XXVII to set up the digit in the ten thousands indication in the indicating or recording device. Alternatively, or additionally the 10,000 pounds arm 139 will move clockwise when a cam 153 attached to the idler pulley 141 on top of the first bell crank 142 contacts a roller 154 carried by the movable vertical arm 152 and pushes the arm 152 away from the stack of permutation disks 11.

The differential arms 138 and 139, thus, each move according to two elements, the 1000 pounds arm 138 being driven clockwise by the upper or thousands indicating pawl arm 21 or/and by the first bell crank 142 and the 10,000 pounds arm 139 being driven clockwise by the second bell crank 148 or/and by the cam 153 attached to the idler pulley 141 on top of the first bell crank 142.

For the purpose of driving the bell cranks 142 and 148, a pair of rigidly interconnected, unit weight cams, a 5000 pounds cam 155 and a 10,000 pounds cam 156, is arranged under the horizontal arms of the bell cranks 142 and 148 and is connected to the unit weight responsive member 135 by the continuous chain 137 so that the pair of cams revolves one step for each unit weight added. The cams 155 and 156 can best be seen in FIGURE XXVII, since such cams are shown behind an additional cam in FIGURE XXVIII having a purpose hereinafter described.

A horizontal arm 157 of the bell crank 142 has a cam-following roller 158 on the periphery of the cam 155 and a horizontal arm 159 of the bell crank 148 has a cam-following roller 160 on the periphery of the cam 156. The cams 155 and 156 are fixed on a shaft 161 mounted for rotation and extending horizontally from the base 99 (see FIGURE XXIX) and are separated from each other on the shaft by a hub 162. The rollers 158 and 160 are kept in contact with their respective unit weight cams 155 and 156 when the cams fall back by the respective return springs 52 operating through the respective cables 23*a* and 23*b*.

The continuous chain 137 runs around a pair of idler sprockets 163 mounted for rotation on the base 99 and around a driving sprocket 164 so mounted on the shaft 161 that the sprocket 164 and the shaft 161 turn as one. Downward movement of the unit weight responsive member 135, caused by unit weights being added to the weighing scale mechanism, drives the chain 137, operatively connected to the member 135 through the fork 136, clockwise as viewed in FIGURE XXVIII which in turn drives the sprocket 164 and the cams 155 and 156 as one clockwise as viewed in FIGURE XXVIII.

The bell cranks 142 and 148 and the vertical arm 152 are mounted for rotation on a fulcrum pin or axle 165 which is secured to the base 99. As viewed from left to right in FIGURE XXIX, the fulcrum pin 165 rotatably carries a hub 166, and the bell crank 148 which is fixed to the hub 166, an idler pulley 167, a hub 168 and the vertical arm 152 which is fixed to the hub 168, another idler pulley 169, a hub 170 and the bell crank 142 which is fixed to the hub 170, and a hub 171 which is fixed to a bell crank 172 having a purpose hereinafter described, a C-clip 173 keeping the arm, pulleys and bell cranks in position on the fulcrum pin.

The complete differential cable drive system for the 1000 pounds arm 138 is from the upper or thousands indicating pawl arm 21 through the cable 23*a* which is led over the idler pulleys 143 and 145, around the bottom of the idler pulley 169 on the fulcrum pin 165, around the idler pulley 141 on top of the bell crank 142, and to the 1000 pounds arm 138, the cable 23*a* being securely fixed to the pulley 141 by means of a clamp 174 and a screw 175 which presses the clamp 174 against the cable 23*a*.

The complete differential cable drive system for the 10,000 pounds arm 139 is from the fixed connection 151 of the cable 23*b* to the movable vertical arm 152 through the cable 23*b* which is led over the idler pulley 149, around the bottom of the idler pulley 167 on the fulcrum pin 165, around the top of the idler pulley 147 on top of the bell crank 148, and to the 10,000 pounds arm 139.

The tension of the particular return spring 52 to which the 10,000 pounds arm 139 is attached constantly urges an abutment surface 176 at the top of the movable vertical arm 152 against an adjustable stop 177 carried by the horizontal extension 150 of the frame member 146. Additionally, such spring tension holds the roller 160 on the bell crank 148 against the periphery of the cam 156. The position of the stop 177 is adjustable to vary the relative positions imparted to the cable 23*b* by the vertical arm 152. The relative positions imparted to the cable 23*a* by the bell crank 142 can be varied by turning an adjustment screw 178 which is threaded through an ear 179 on the upper part 180 of the bell crank 142 and which bears against an ear 181 on the lower part 182 of the bell crank 142 to pivot the upper part 180 about the axis of its pivotal connection 183 to the lower part 182. A lock nut 184 on the screw 178 holds the parts 180 and 182 of the bell crank 142 in adjusted position. The adjustments provided by the stop 177 and the screw 178 are necessary to compensate for slightly different sized parts as manufactured in production runs. Test weights are put on each scale before it is delivered and the adjustments are made by trial and error until the indicating or recording device indicates accurate weights.

The 5000 pounds cam 155 and the 10,000 pounds cam 156 are turned clockwise from their zero positions shown in FIGURES XXVII and XXVIII one step for each 5000 pounds unit weight added. As hereinbefore mentioned, for the purpose of illustration only, the chart 2 is given a dial capacity of 5000 pounds and each of the unit weights is given a counterbalancing capacity of 5000 pounds so that the dial capacity of 5000 pounds plus the 45,000 pounds capacity provided by the unit weights gives a total scale capacity of 50,000 pounds.

The height of each rise 185 on the 5000 pounds unit weight cam 155 is designed so that the idler pulley 141 on top of the bell crank 142, which is driven by the cam, is drawn back enough every time that the roller 158 on the bell crank 142 is on top of a rise 185 to move the 1000 pounds differential arm 138 clockwise and the recording mechanism operatively connected thereto five digits ahead in its thousands indication. Consequently, the thousands digit set up in the recording machine will be the sum of the digit selected from the chart 2, the 1000 pounds differential arm 138 exactly reproducing the movements of the upper or thousands indicating (1000 decade) pawl arm 21 operatively attached thereto, plus the digit value fed in by the unit weight cam 155.

Rotation of the bell crank 142 counterclockwise about the axis of the fulcrum pin 165, as viewed in FIGURES XXVII and XXVIII, caused by its roller 158 being on top of a rise 185 on the unit weight cam 155 moves the pulley 141 on top of the bell crank 142 back bodily and also revolves the pulley 141 about its pivot 186 on the bell crank 142 to turn the differential arm 138 clockwise. When the reading device senses the graduations on the chart 2, the upper or thousands indicating pawl arm 21 is rotated and this revolves the pulley 141 additionally about its pivot 186 and turns the differential arm 138 additionally. Rotation of the pulley 141 rocks the cam 153 attached thereto. When the upper or thousands indicating pawl arm 21 stops at a five, i.e., 5000 pounds sensed, the cam 153 is moved into such a position that when the bell crank 142 is rocked counterclockwise by the unit weight cam 155 feeding a 5000 pounds unit weight indication into the differential cable system, the cam 153 contacts the roller 154 on the vertical arm 152 and rocks the arm 152 counterclockwise about the axis of the fulcrum pin 165 to move the 10,000 pounds differential arm 139, operatively connected to the vertical arm 152, clockwise and the recording mechanism operatively connected to the differential arm 139 one digit ahead in its ten thousands indication.

The height of each step 187 on the 10,000 pounds unit weight cam 156 is designed so that the idler pulley 147 on top of the bell crank 148, which is driven by the cam, is drawn back enough every time that two unit weights are placed in operative position on the weighing scale and the roller 160 on the bell crank 148 is on a step 187 to move the 10,000 pounds differential arm 139 clockwise and the recording mechanism operatively connected thereto to one digit ahead in its ten thousands indication.

The arrangement for adding the unit weight indication into the chart reading device, insofar as it has been described, requires that the chart 2 be altered slightly to read out zero instead of blank so that, for example, 15 pounds will be read out by the chart reading device as 0015 pounds to have the correct zero appear in the indication when larger loads which are counterbalanced by unit weights are placed upon the scale. For example, if a load weighing 5015 pounds is placed upon the scale and 5000 pounds of the load are counterbalanced by a unit weight and 15 pounds of the load are counterbalanced by the automatic counterbalancing mechanism, it is necessary that 5015 pounds be indicated and not 5(blank)15 pounds. Such alteration of the chart 2 is accomplished by having the first graduation on the chart carry a raised portion in the A and D row so that the code opposite "Blank" in the table in FIGURE XI is simply changed to be like the code opposite "0" in such table.

In operation, a load is placed upon the scale and the operator looks through the lens 8 (FIGURE I) to see if the load has exceeded the capacity of the chart 2. If the chart 2 indicates visually that the load weighs more than 5000 pounds (the chart has graduations 7 extending 45 pounds beyond full capacity), the operator cranks on one unit weight. If the chart 2 indicates that the part of the load not counterbalanced by unit weights still weighs more than chart capacity, the operator cranks on a second unit weight and so on until the chart 2 visually indicates something less than 5000 pounds.

The cranking on of the first unit weight causes the unit weight responsive member 135 to move downward. The member 135, through the chain 137, drives the unit weight cams 155 and 156 as one clockwise as viewed in FIGURES XXVII and XXVIII. One of the rises 185 on the 5000 pounds cam 155 then lifts the roller 158 up and rocks the bell crank 142 counterclockwise about the axis of the fulcrum pin 165. This moves the 1000 pounds differential arm 138, operatively connected to the bell crank 142, clockwise and the recording mechanism operatively connected thereto five digits ahead in its thousands indication. It is to be understood as hereinbefore described that, instead of positioning recording mechanism, such as a printer, through the cables 23, the reading device may carry ordinary commutator brushes which may cooperate with a series of commutators so that the result may be transmitted to a set of solenoids in a recording machine, such as an electric typewriter, by passing an electric pulse through each commutator in succession. If a series of commutators were used, instead of the cable 23, attached to the arm 138, pulling the recording mechanism, such as a printer, five digits ahead in the present instance, a brush on the arm 138 would stop at the five wire on the respective commutator. The height of the first step 187 on the 10,000 pounds unit weight cam 156 is such that no movement of bell crank 148 occurs when the first unit weight is cranked on the scale.

The cranking on of the second unit weight (10,000 pounds) causes the unit weight responsive member 135 to move downward a second step and, therefore, the cams 155 and 156 to turn clockwise a second step. The roller 158 then moves into a low spot 188 on the periphery of the cam 155 between rises 185 and the 1000 pounds differential arm 138 moves back, under the influence of its return spring 52, to its original or starting position. The first step 187 on the 10,000 pounds unit weight cam 156, however, lifts the roller 160 up and rocks the bell crank 148 counterclockwise about the axis of the fulcrum pin 165. This moves the 10,000 pounds differential arm 139, operatively connected to the bell crank 148 clockwise and the recording mechanism operatively connected thereto one digit ahead in its ten thousands indication.

There are five of the rises 185 on the unit weight cam 155 which are so separated by the low spots 188 that the first, third, fifth, seventh and ninth unit weight additions cause the differential arm 138 to be rocked clockwise to move the recording mechanism five digits ahead in its thousands indication as hereinbefore described in connection with the addition of the first unit weight. There also are five of the low spots 188 between the rises 185 which permit the differential arm 138 to be rocked counterclockwise by its return spring 52 to its original or starting position after the second, fourth, sixth, and eighth unit weight additions as hereinbefore described in connection with the addition of the second unit weight.

The steps 187 on the unit weight cam 156, however, are cumulative so that the second, fourth, sixth, and eighth unit weight additions cause the differential arm 139 to move the recording mechanism ahead one digit for each of such additions, as hereinbefore described in connection with the addition of the second unit weight, so that eight unit weight additions, i.e., 40,000 pounds counterbalanced by unit weights, cause the recording mechanism to be moved ahead four digits in its ten thousands indication.

If, after the operator cranks on the second unit weight, the chart 2 visually indicates something less than 5000 pounds, the operator causes the start signal to be given to the motor 26 which turns one revolution and drives the chart reading device that sets up the recording mechanism additionally according to the weight of the load upon the scale not counterbalanced by unit weights.

As a specific example, if a load weighing 11,000 pounds is placed upon the scale, the operator cranks on two unit weights. This leaves the 1000 pounds arm 138 in its original position and drives the 10,000 pounds arm 139 so as to move the recording mechanism one digit ahead in its ten thousands indication. The operator then starts the motor 26 and the reading device reads out 1000 pounds from the chart 2 and moves the cable 23 operatively attached to the upper pawl arm 21 through the 1000 pounds arm 138 accordingly to move the recording mechanism one digit ahead in its thousands indication. The recording mechanism then is set up to record 11,000 pounds in one figure in one operation.

As another specific example, if a load weighing 6,000 pounds is placed upon the scale, the operator cranks on one unit weight. This leaves the 10,000 pounds arm 139 in its original position and drives the 1000 pounds arm 138 so as to move the recording mechanism five digits ahead in its thousands indication. The operator then starts the motor 26 and the reading device reads out 1000 pounds from the chart 2 and moves the 1000 pounds arm 138, which exactly reproduces the movements of the upper pawl (1000 decade) arm 21, additionally so as to move the recording mechanism one digit ahead additionally in its thousands indication, i.e., from five to six. The recorder then is set up to record 6,000 pounds in one figure in one operation.

The cam 153 attached to the pulley 141 is used only in the special case when the reading device reads out 5000 pounds or more from the chart 2 (the chart has graduations extending 45 pounds beyond full capacity). For example, if a load weighing 10,000 pounds is placed upon the scale, the operator might crank on only one unit weight (5000 pounds). This leaves the 10,000 pounds arm 139 in its original position and drives the 1000 pounds arm 138 so as to move the recording mechanism five digits ahead in its thousands indication. The operator then starts the motor 26 and the reading device reads out 5000 pounds from the chart 2 and moves the 1000 pounds arm 138 additionally so as to move the recording mechanism five digits ahead additionally to be set up to record zero in its thousands indication. As hereinbefore described, when the upper or thousands indicating pawl arm 21 senses a five, i.e., 5000 pounds, the cam 153 is moved into such a position that when the bell crank 142 is rocked counterclockwise by the unit weight cam 155 feeding a 5000 pounds unit weight indication into the differential cable system the cam 153 contacts the roller 154 on the vertical arm 152 and rocks the arm 152 counterclockwise about the axis of the fulcrum pin 165 to move the 10,000 pounds differential arm 139, operatively connected to the vertical arm 152, clockwise and the recording mechanism operatively connected to the arm 139 one digit ahead in its ten thousands indication. The recorder then is set up to record 10,000 pounds in one figure in one operation.

As a final specific example, if a load weighing 50,000 pounds is placed upon the scale, the operator cranks on nine unit weights (45,000 pounds). This drives the 10,000 pounds arm 139 clockwise so as to move the recording mechanism four digits ahead in its ten thousands indication and also drives the 1000 pounds arms 138 clockwise so as to move the recording mechanism five digits ahead in its thousands indication. The operator then starts the motor 26 and the reading device reads out the 5000 pounds not counterbalanced by the nine unit weights. This causes the 1000 pounds arm 138 to be moved clockwise additionally so as to move the recording mechanism five digits ahead additionally to set the recorder to record zero in its thousands indication and causes the cam 153 to drive the vertical arm 152 back and move the 10,000 pounds differential arm 139 clockwise additionally so as to move the recording mechanism one digit ahead additionally, i.e., from four to five, in its ten thousands indication. The recorder then is set up to record 50,000 pounds in one figure in one operation.

Any chart capacities and any unit weight capacities may be chosen other than the 5000 pounds chart capacity and the 5000 pounds unit weight capacity hereinbefore specifically used as an exemplification. In changing capacities, it is only neecssary to use modified unit weight cams which will properly position the differential arm or arms according to the capacities of the unit weights.

For example, if the nine unit weights each have a capacity of 1000 pounds and the chart 2 also has a capacity of 1000 pounds, it is necessary to use only one unit weight cam having a series of nine cumulative steps each one of which causes the 1000 pounds differential arm 138 to be moved ahead one digit in the thousands indication. In such an arrangement, the upper or thousands indicating pawl arm 21 drives the differential arm 138 additionally as usual.

In order to simplify the structure and reduce the number of parts and therefore cost, it is sometimes preferable to give the 1000 pounds unit weight scale an effective dial or chart capacity of only 999 pounds so that the total scale capacity is 9,999 pounds, a four instead of a five digit figure. However, the 1000 pounds unit weight scale may be given a 10,000 pounds total capacity by using a disk in place of the second unit weight cam 156 or by clamping the second bell crank 148 in a fixed position and by having the 1000 decade pawl arm 21, whenever it stops at 1 instead of 0 and when nine unit weights are in operative position, revolve the cam 153 to strike the roller 154 and thereby pull the 10,000 pounds differential arm 139 to indicate a 1 in the ten thousands indication.

Alternatively, the 1000 pounds unit weight scale may be given a 10,000 pounds total capacity, when a printer is used as the recording mechanism, by simply forming a 10 on the tenth position on the printing wheel or sector in the printer in the thousands decade, i.e., the modified thousands decade printing wheel or sector contains 0, 1, 2, 3, 4, 5, 6, 7, 8, 9, 10 indicia instead of the usual 0, 1, 2, 3, 4, 5, 6, 7, 8, 9, indicia. This construction makes possible the elimination of the second unit weight cam 156, the second bell crank 148 and the several parts associated therewith, because, when nine unit weights are in place (9000 pounds counterbalanced by unit weights) and the 1000 decade pawl arm 21 stops at 1 (1000 pounds counterbalanced by the automatic load counterbalancing mechanism), the 1000 decade pawl arm 21 pulls the differential arm 138 additionally and the printer operatively attached thereto additionally one digit ahead from 9 to 10 in the thousands indication to print 10,000 pounds in one figure in one operation.

If the nine unit weights each have a capacity of 2000 pounds and the chart 2 also has a capacity of 2000 pounds, two unit weight cams which correspond to the unit weight cams 155 and 156 are used, except that the rises or steps on the modified cams are designed for moving the differential arms 138 and 139 according to unit weights each counterbalancing 2000 pounds instead of 5000 pounds. The rises or steps on the modified cams are similar to those on the 1000 pounds unit weight cam and disk for the first four unit weight additions and are somewhat similar to those on the 5000 pounds unit weight cams for the rest of the unit weight additions. That is, the second or ten thousands unit weight cam does nothing during the first four unit weight additions and the first or thousands unit weight cams adds 2000 pounds unit weight indication cumulatively into the chart reading device during the first four unit weight additions; however, on the addition of the fifth unit weight (10,000 pounds), the first cam goes back to zero and the second cam drives the differential arm 139 to indicate a 1 in the ten thousands indication, on the addition of the sixth unit weight (12,000 pounds), the first cam has a rise which drives the differential arm 138 to indicate a 2 in the thousands indication while the second cam's step maintains the 1 in the ten thousands indication, etc.

The arrangement for adding the unit weight indication into the chart reading device, insofar at it has been described, requires that the chart 2 be altered slightly to read out zero instead of blank, so that, for example, 15 pounds will be read out by the chart reading device as 0015 pounds to have the correct zero appear in the indication when larger loads, such as 5015 pounds, which are counterbalanced in part by unit weights are placed upon the scale, as hereinbefore described.

The chart 2, however, may be used in its unaltered form, i.e., using the "Code" shown in FIGURE XI, to avoid recording redundant zeros, e.g., 0015 pounds becomes 15 pounds, with the arrangement for adding unit weight indication into the chart reading device when the zero suppression or the zero locking device which is illustrated in detail in FIGURES XXX and XXXI is incorporated into the mechanism.

When any unit weight is added under such circumstances, it is necessary to restore the "Blanks" to "Zeros," e.g., 1(blank)15 pounds must become 1015 pounds. This is achieved by providing locking arms 189, one for each of the 1000 decade, 100 decade, and 10 decade permutation arms 21, on the support post 87 in the stack which are made to swing inward toward the center of the stack by means of a locking cam 190 on the same cam shaft 161 as the unit weight cams 155 and 156 when the first unit weight is dropped, the three locking arms 189 remaining in such position until all of the unit weights are removed. When in locking position, the inner ends 191 of the locking arms 189 catch on steps 192 (FIGURES IV and XXX) in the back of the 1000 decade, 100 decade, and 10 decade permutation arms 21 to prevent them from moving beyond "Zero" to "Blank," but they do not prevent movement in the other direction.

The locking cam 190 (FIGURES XXVIII and XXIX), which turns as one with the shaft 161 and the unit weight cams 155 and 156, has one long rise 193 which lifts a cam-following roller 194 on the horizontal arm of the bell crank 172 upward to rock the bell crank about the axis of the fulcrum pin 165 counterclockwise as viewed in FIGURE XXVIII as soon as the first unit weight is dropped and maintains the bell crank in such position until all of the unit weights are removed. A return spring 195 extending between a stud 196 carried by the base 99 and the horizontal arm of the bell crank 172 keeps the roller 194 always on the periphery of the locking cam 190.

The distance between the lower shoulder 89 and the upper shoulder 95 on the support post 87 is less than the distance between the lower and upper plates 88 and 94 of the frame 85 so that the post 87 is free to pivot about its axis. A brass washer 197 provides a bearing surface for the post 87. Each of the three locking arms 189 have bifurcated ears 198 having integrally formed keys 199 which cooperate with a longitudinally extending keyway 200 cut in the side of the support post 87. There is a notch 86 for each of the locking arms 189 in the support post 87 in addition to the notches 86 which hold the bifurcated ears 29 of the spacers 27. One of the three notches 86 for the locking arms 189 is shown in detail in FIGURES XXX and XXXI. The bifurcated ears 198 of the locking arms 189 are received in the notches 86 and the keys 199 are received in the keyway 200 which has a depth equal to the depth of the notches 86. A bracket 201 also is keyed to the support post 87 by means of a key 202 and a keyway 203, the bracket 201 being held between the lower shoulder 89 on the post 87 and the upper bearing surface of the brass washer 197. The bracket 201 has an upstanding ear 204 which is connected to the top of the bell crank 172 by means of a rod 205, there being a spring 206 surrounding an end of the rod 205 which is clamped between the ear 204 and a clamp member 207 on the rod and which functions to absorb excess rod movement.

Counterclockwise movement of the bell crank 172 about the axis of the fulcrum pin 165 caused by the roller 194 on the bell crank 172 being lifted by the rise 193 on the locking cam 190 when the first unit weight is dropped pulls the rod 205 to the left as indicated by the straight arrow in FIGURE XXX. This pivots the post 87, operatively connected to the rod 205, and the locking arms 189 keyed to the post clockwise as indicated by the curved arrow in FIGURE XXX. When the permutation arms 21 are swept clockwise by the drive member 13 as seen in FIGURE IV, the steps 192 on the arms 21 are moved away from the inner ends 191 on the locking arms 189 so that the locking arms can move inward toward the center of the stack, as driven by the post 87, into locking position. On the counterclockwise return motion of the drive member 13, the pawl carriers 21 follow as urged by their drive springs 52 until their pawls 20 find aligned notches in a particular combination of permutation disk with which they cooperate. However, when in locking position, the inner ends 191 of the locking arms 189 catch on the steps 192 in the back of the permutation arms 21 to prevent the 1000 decade, 100 decade, and 10 decade arms 21 from moving beyond "Zero" to "Blank."

It should be noted that the units decade permutation arm 21 is not locked by the zero locking device so that such arm 21 always is free to overtravel whenever it cannot find an aligned notch in the periphery of the permutation disks 11 associated therewith to cause an error indication or recording to be made, such as a printer "E" or "X," as hereinbefore described. The major use of such error indication or recording is to indicate weighing beyond chart capacity. The locking arms 189 do not prevent clockwise movement of the 1000 decade, 100 decade, and 10 decade permutation arms 21 as seen in FIGURE IV and only prevent counterclockwise movement beyond zero indication. Hence, when the unit weight mechanism is not operated and, therefore, the zero suppression or locking device is not operated and a chart 2 using the "Code" shown in FIGURE XI is employed, redundant zeros are not recorded, e.g., 0015 pounds becomes 15 pounds. Alternatively, a symbol, such as =, may be recorded instead of a blank by forming symbols on the printing wheels or sectors in place of blanks, e.g., 0015 pounds becomes ==15 pounds. However, when a load beyond the capacity of the chart 2 is placed upon the scale and all or part of such load is counterbalanced by unit weights, the "Blanks" are restored to "Zeros" by means of the zero locking device which simply prevents the 1000 decade, 100 decade, and 10 decade permutation arms 21 from moving beyond "Zero" to "Blank" and, for example, what would be an indication of 1(blank)15 pounds without using the zero locking device becomes an indication of 1015 pounds through the use of the zero locking device.

The embodiment of the invention described in connection with the drawings is to be regarded as illustrative only since the invention is susceptible to variation, modification and change within the spirit and scope of the appended claims.

Having described the invention, I claim:

1. In a reading device having a code-bearing chart positionable by condition responsive mechanism and means for sensing the code, in combination, first and second differential arms, resilient means connected to the arms, a driven element, a first cable, the first arm being operatively connected by means of the first cable to the sensing means and positionable in opposition to the resilient means by the sensing means to indication position in a first denominational order according to the sensed code, an idler pulley engaging the first cable intermediate the connected sensing means and the first arm, first driving means rotatably mounting the pulley for selectively positioning the first arm additionally in opposition to the resilient means to add to its indicating position, a second cable interconnecting the driven element and the second arm, second driving means cooperating with the second cable intermediate the connected driven element and the second arm for selectively positioning the second arm in opposition to the resilient means to indication position in a second denominational order, and a cam carried by the pulley positionable both by the sensing means and by the first driving means for driving the driven element to effect carry transfer from the first order to the second order by positioning the second arm additionally in opposition to the resilient means to add to its indicating position, whereby the arms indicate two denominational orders of the sum of a code sensing and at least one selected increment.

2. In a reading device having a code-bearing chart positionable by condition responsive mechanism in combination, code sensing means for obtaining a chart reading, the sensing means including a pawl arm for a denominational order in the chart reading movable in a path having at least eleven indicating positions extending from nine position through zero position and then to blank position, the blank position avoiding the indication of a redundant zero, and locking means selectively engageable with the pawl arm for preventing movement of the pawl arm in that portion of its path from zero position to blank position whenever it is desired to change an indication of blank to an indication of zero in said denominational order.

3. In a reading device having a code-bearing chart positionable by condition responsive mechanism and code sensing means for obtaining a chart reading, the sensing means including a pawl arm for a denominational order in the chart reading movable in a path having at least eleven positions extending from nine position through zero position and then to blank position, the blank position avoiding the indication of a redundant zero, in combination, a differential arm operatively connected to the pawl arm and positionable by the pawl arm to indicating position according to the position of the pawl arm in its path, selectively operable drive means operatively connected to the differential arm for positioning the differential arm additionally to add to said indicating position, and means driven by the drive means engageable with the pawl arm for preventing movement of the pawl arm in that portion of its path from zero position to blank position whenever the differential arm is so positioned additionally by the drive means.

4. In a reading device having a code-bearing chart positionable by condition responsive mechanism and code sensing means for obtaining a chart reading, the sensing means including a pawl arm for a denominational order in the chart reading movable in a path having at least eleven position extending from nine position through zero position and then to blank position, in combination, a cable, a differential arm operatively connected by means of the cable to the pawl arm and positionable by the pawl arm to indicating position according to the position of the pawl arm in its path, a pivotally mounted bell crank operatively connected to the cable intermediate the differential arm and the pawl arm, selectively operable cam means for driving the bell crank to position the differential arm adidtionally to add to said indicating position, and lock means driven by the cam means simultaneously with the driving of the bell crank engageable with the pawl arm for preventing movement of the pawl arm in that portion of its path from zero position to blank position, whereby blanks sensed by the pawl arm are indicated as blanks by the differential arm in the absence of operation of the cam means to avoid the indication of redundant zeros and whereby blanks sensed by the pawl arm are indicated by the differential arm as zeros whenever the cam means is operated.

References Cited in the file of this patent

UNITED STATES PATENTS

| | | |
|---|---|---|
| 2,444,549 | Anderson | July 6, 1948 |
| 2,450,283 | Jones | Sept. 28, 1948 |
| 2,583,666 | Pitman | Jan. 29, 1952 |
| 2,792,208 | Merrill et al. | May 14, 1957 |
| 2,792,275 | Drillick et al. | May 14 ,1957 |

FOREIGN PATENTS

| | | |
|---|---|---|
| 396,837 | Great Britain | Aug. 17, 1933 |
| 291,556 | Italy | Dec. 19, 1931 |